(12) United States Patent
Terashima et al.

(10) Patent No.: US 10,229,472 B2
(45) Date of Patent: Mar. 12, 2019

(54) IMAGE PROCESSING APPARATUS, IMAGE PROCESSING METHOD, AND VEHICLE CONTROL APPARATUS

(71) Applicant: Renesas Electronics Corporation, Tokyo (JP)

(72) Inventors: Kazuaki Terashima, Buckinghamshire (GB); Yuki Kajiwara, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 74 days.

(21) Appl. No.: 15/422,700

(22) Filed: Feb. 2, 2017

(65) Prior Publication Data

US 2017/0278214 A1 Sep. 28, 2017

(30) Foreign Application Priority Data

Mar. 25, 2016 (JP) .................................. 2016-061868

(51) Int. Cl.
*G06K 9/00* (2006.01)
*G06T 1/20* (2006.01)
(Continued)

(52) U.S. Cl.
CPC ............. *G06T 1/20* (2013.01); *G05D 1/0246* (2013.01); *H04N 13/207* (2018.05)

(58) Field of Classification Search
CPC ......... G06T 3/4007; G06T 1/20; G06T 7/593; G06K 9/32; H04N 13/10
(Continued)

(56) References Cited

U.S. PATENT DOCUMENTS 6,009,205 A * 12/1999 Yoshida ................. G06T 9/007
382/246
6,317,159 B1 * 11/2001 Aoyama ................ G09G 5/005
348/441

(Continued)

FOREIGN PATENT DOCUMENTS

JP 2002-182905 A 6/2002
JP 2003-296096 A 10/2003

OTHER PUBLICATIONS

Extended European Search Report received in corresponding European Application No. 17162563.5 dated Jun. 29, 2017.
(Continued)

*Primary Examiner* — Charlotte M Baker
(74) *Attorney, Agent, or Firm* — Mattingly & Malur, PC

(57) ABSTRACT

Image processing is made efficient. An image processing apparatus according to an embodiment includes a line memory, a plurality of pipelines, and a line memory control circuit that controls data reading from the line memory to processing units. The processing unit includes a first operator that performs a first arithmetic operation, a second operator which performs a second arithmetic operation based on first intermediate data based on an arithmetic operation result of the first operator and which calculates second intermediate data according to the first intermediate data of when peripheral pixels are sequentially changed, third operators which perform a third arithmetic operation based on the first intermediate data and which calculate third intermediate data according to the first intermediate data of when the peripheral pixels are sequentially changed, and delay elements that delay the third intermediate data.

19 Claims, 19 Drawing Sheets

(51) Int. Cl.
*H04N 13/207* (2018.01)
*G05D 1/02* (2006.01)

(58) Field of Classification Search
USPC ........ 382/104, 246, 284; 348/458, 441, 443, 348/448, E7.012
See application file for complete search history.

(56) References Cited

U.S. PATENT DOCUMENTS

| | | | |
|---|---|---|---|
| 7,171,535 B2 | 1/2007 | Naoi | |
| 8,498,500 B2 * | 7/2013 | Hoshino | ............... G06T 3/40 382/284 |
| 2006/0090060 A1 | 4/2006 | Drescher | |

OTHER PUBLICATIONS

Kayaalp, A. E. et al., "A Pipeline Architecture for Near Real-Time Stereo Range Detection", Optomechatronic Micro/Nano Devices and Components III, Jan. 1, 1989, pp. 279-286, vol. 1007.
Communication Pursuant to Article 94(3) EPC received in corresponding European Application No. 17 162 563.5 dated Jul. 10, 2018.
Rosdi, B. A. et al., "Replacement of Register with Delay Element for Reducing the Area of Pipelined Circuits", Circuits and Systems, IEEE Asia Pacific Conf. on IEEE, Dec. 1, 2006, pp. 801-804.
Anonymous, "SN54LS31, SN74LS31 Delay Elements", In: "Texas Instruments Production Data Information", Mar. 1, 1988, pp. 1-6.
Anonymous, "MC14557B 1-to-64 Bit Variable Length Shift Register", On Semiconductors, Jun. 1, 2011, pp. 1-8.

* cited by examiner

FIG. 5
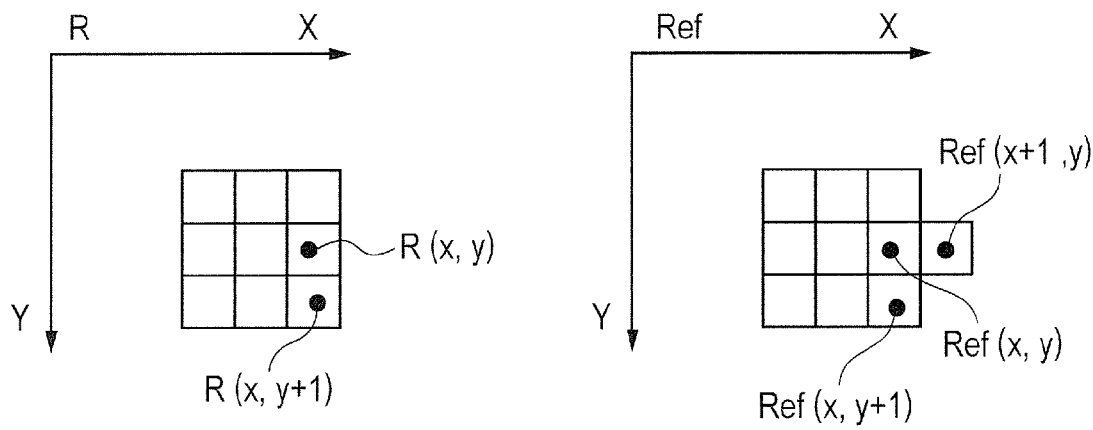
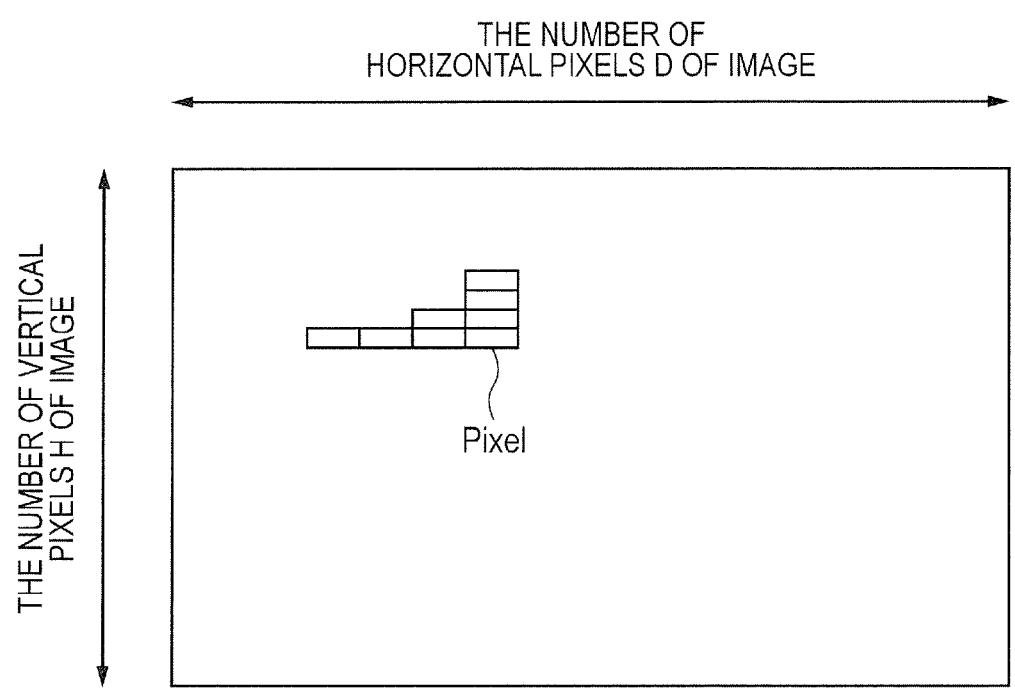

FIG. 16
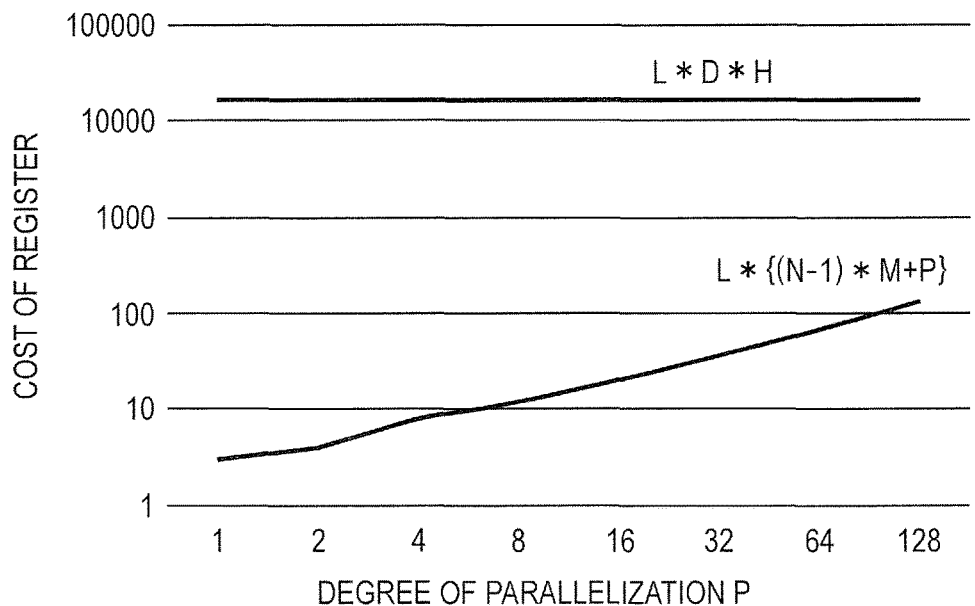
FIG. 17
CONFIGURATION OF
COMPARATIVE EXAMPLE
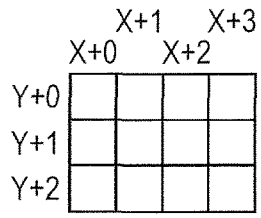
CONFIGURATION
OF EMBODIMENT
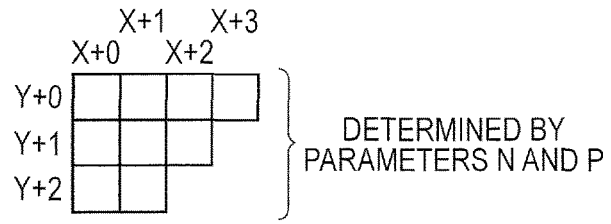
} DETERMINED BY
PARAMETERS N AND P
DETERMINED BY
PARAMETERS M AND P
FORMULA REPRESENTING STRUCTURE
OF COMPARATIVE EXAMPLE
$\{P+(N-1)\} * \{P+M-2\}$
FORMULA REPRESENTING
STRUCTURE OF EMBODIMENT
$\{P+(N-1)\} * \{P+M-2\} - \sum_{n=1}^{P+M-2} n$
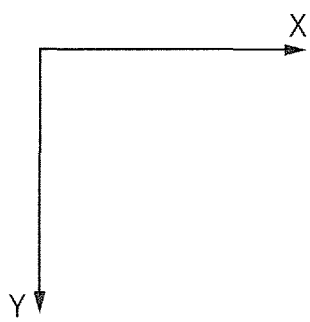

IMAGE PROCESSING APPARATUS, IMAGE PROCESSING METHOD, AND VEHICLE CONTROL APPARATUS

CROSS-REFERENCE TO RELATED APPLICATIONS

The disclosure of Japanese Patent Application No. 2016-061868 filed on Mar. 25, 2016 including the specification, drawings and abstract is incorporated herein by reference in its entirety.

BACKGROUND

The present invention relates to an image processing apparatus, an image processing method, and a vehicle control apparatus.

Demands for high-speed operations of data processing apparatuses which perform image processing and audio processing have increased year by year. In particular, for an image processing apparatus and an image recognition apparatus that are applied for vehicles, not only high speed processing but also a technique to accurately detect and recognize an object is required.

This trend increases more and more following enlargement of image data due to development of multimedia and enrichment of contents in recent years.

In particular, a huge amount of image data and a huge number of processing times are required to calculate motion information and distance information from high density pixel information in a front monitoring system. Therefore, it is anticipated that high performance will be further required hereafter.

To meet the requirement, Japanese Unexamined Patent Application Publication No. 2003-296096 discloses an arithmetic apparatus in which parallel processing is performed by pipeline processing. A plurality of arithmetic units are coupled in series in Japanese Unexamined Patent Application Publication No. 2003-296096. Arithmetic operation data of a pre-stage arithmetic unit is outputted to a post-stage arithmetic unit.

Japanese Unexamined Patent Application Publication No. 2002-182905 discloses an apparatus in which an arithmetic instruction is performed by a plurality of arithmetic elements. A register can be directly accessed from each of the arithmetic elements in Japanese Unexamined Patent Application Publication No. 2002-182905. The register holds an arithmetic operation result of each arithmetic element.

SUMMARY

To control complicated contents in recent years, a complex control is required in which an arithmetic unit performs an arithmetic operation by using an arithmetic operation result of another arithmetic unit. Each arithmetic unit may refer to a processing result of an arithmetic unit arranged prior to a pre-stage arithmetic unit. In this case, in a pipeline configuration disclosed in Japanese Unexamined Patent Application Publication No. 2003-296096, it is necessary to assign again a processing result as an input to a post-stage arithmetic unit. When the number of pipeline stages is large, an instruction system becomes complicated. Further, there is a problem that control to select a register is complicated.

Further, when a method described in Japanese Unexamined Patent Application Publication No. 2002-182905 is applied to a stereo image described in "Accurate and Efficient Stereo Processing by Semi-Global Matching and Mutual Information", Internet search: http://www.robotic.dlr.de/fileadmin/robotic/hirschmu/cvpr05hh.pdf, a problem occurs in which the number of registers that hold intermediately-generated data increases.

In processing such as stereo processing and optical flow processing, there is a comparison image that is compared with a target image. In the stereo processing, different cameras handle an image of the same time. In the optical flow processing, the same camera handles images of different times. A case is considered in which an arithmetic operation is performed by using pixel data of the two images. The pipeline processing is configured by a plurality of stages. There are many arithmetic operations in which amplification and selection are repeated in each stage.

The amplification is an arithmetic operation to calculate many selection candidates. The selection is an arithmetic operation to select optimal data from among a plurality of selection candidates. Therefore, in processing such as the stereo processing and the optical flow processing, a huge number of selection candidates that are intermediately generated or a huge amount of data for generating the selection candidates is generated. Therefore, when employing a method of performing optimization calculation of a function result applied to the stereo processing and the optical flow processing on a one-dimensional path, a problem occurs in which the number of registers that hold intermediately-generated data increases.

Other objects and novel features will become apparent from the description of the present specification and the accompanying drawings.

According to an embodiment, an image processing apparatus includes a plurality of pipelines arranged in parallel. Each of the pipelines has multi-stage processing units. Each of the processing units includes a first operator that performs a first arithmetic operation based on target pixel data corresponding to a target pixel of a first image and peripheral pixel data corresponding to peripheral pixels of the target pixel in a second image, a second operator which performs a second arithmetic operation based on first intermediate data based on an arithmetic operation result of the first operator and which calculates second intermediate data according to the first intermediate data of when the peripheral pixels are sequentially changed, a third operator which performs a third arithmetic operation based on first intermediate data and which calculates third intermediate data according to the first intermediate data of when the peripheral pixels are sequentially changed, a register that holds the second intermediate data of when the peripheral pixels are sequentially changed, and a delay element that delays the third intermediate data from the third operator.

According to the embodiment, it is possible to efficiently perform image processing.

BRIEF DESCRIPTION OF THE DRAWINGS

FIG. 5 is a diagram for explaining pixels of a first and a second images in the image processing in FIG. 4.

FIG. 16 is a graph showing a relationship between a degree of parallelization and a cost of register.

FIG. 17 is a diagram showing a configuration of a line memory.

DETAILED DESCRIPTION

Figure 1:
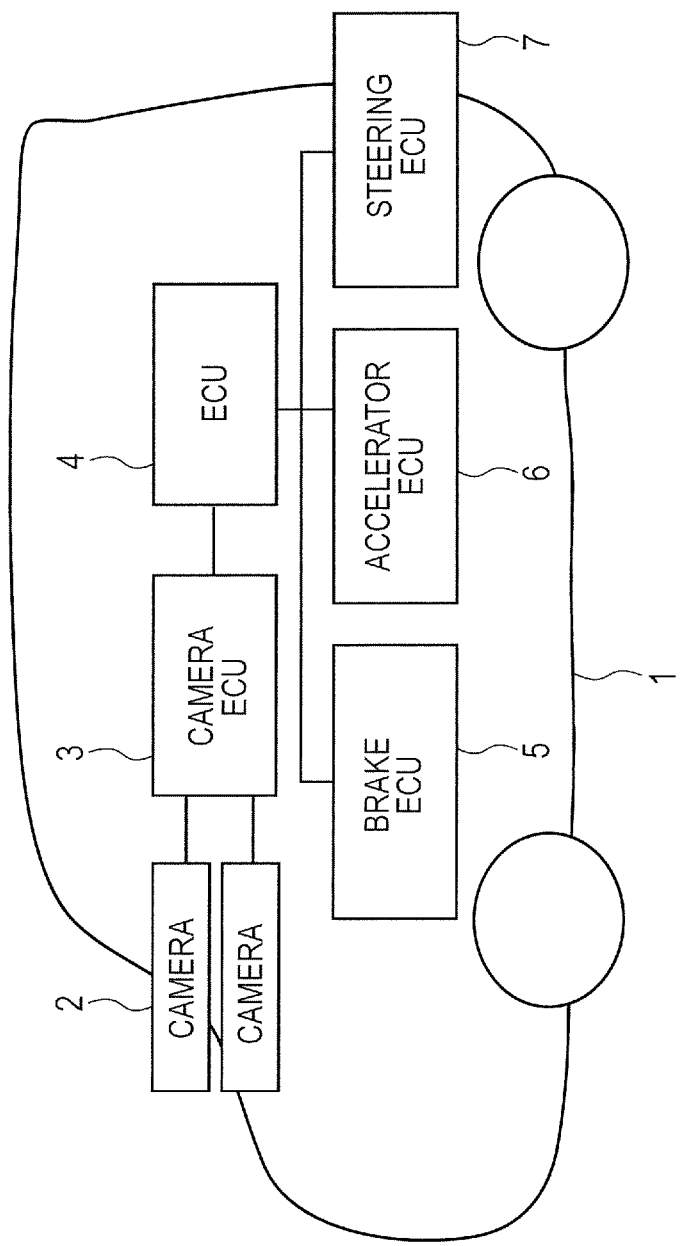
FIG. 1 is a block diagram showing a configuration of a vehicle on which an image processing apparatus is mounted.

For clarity of explanation, the following description and drawings are appropriately omitted and simplified. The components shown in the drawings as functional blocks that perform various processing can be formed by a CPU, a memory, and other circuits as hardware and are realized by a program and the like loaded in a memory as software. Therefore, it should be understood by those skilled in the art that the functional blocks can be realized in various forms by only hardware, only software, or a combination of these, and the functional blocks are not limited to any one of hardware, software, and a combination of these. In the drawings, the same components are denoted by the same reference symbols and redundant description is omitted as appropriate.

The program described above can be stored in various types of non-transitory computer readable media and supplied to a computer. The non-transitory computer readable media include various types of tangible storage media. Examples of the non-transitory computer readable media include a magnetic recording medium (for example, flexible disk, magnetic tape, and hard disk drive), a magneto-optical recording medium (for example, magneto-optical disk), a CD-ROM (Read Only Memory), a CD-R, a CD-R/W, and a semiconductor memory (for example, mask ROM, PROM (Programmable ROM), EPROM (Erasable PROM), flash ROM, and RAM (Random Access Memory)). The program may be supplied to a computer by various types of transitory computer readable media. Examples of the transitory computer readable media include an electrical signal, an optical signal, and an electromagnetic wave. The transitory computer readable media can supply the program to a computer through a wired communication path such as an electrical wire and an optical fiber or a wireless communication path.

An image processing apparatus according to the embodiment is an image processing apparatus that performs pipeline processing on two images in parallel. That is, the image processing apparatus includes a plurality of pipelines arranged in parallel. Each pipeline includes multi-stage processing units. Data calculated by the processing unit is outputted to a post-stage processing unit. Thereby, the pipeline processing can be performed.

For example, the two images are a stereo image captured at the same time by a stereo camera having two cameras in a left-right direction or two images captured at different timings by one camera. It is possible to obtain distance information and motion information of a pattern by performing pattern matching in the stereo processing and the optical flow processing. As the pattern matching, it is possible to use semi-global matching described in "Accurate and Efficient Stereo Processing by Semi-Global Matching and Mutual Information", Internet search: http://www.robotic.dlr.de/fileadmin/robotic/hirschmu/cvpr05hh.pdf.

In the embodiment, an example will be described in which image processing is performed on a stereo image captured by a stereo camera mounted on a vehicle. Further, the image processing apparatus is used for a front monitoring system of a vehicle. It is possible to perform automatic control of a vehicle based on an image processing result of the image processing apparatus.

First Embodiment (Configuration of Vehicle)

First, a configuration of a vehicle on which an image processing apparatus is mounted will be described. FIG. 1 is a diagram showing a control configuration of a vehicle 1. The vehicle 1 has a camera 2, a camera ECU (Electronic Control Unit) 3, an EUC 4, a brake ECU 5, an accelerator ECU 6, and a steering ECU 7. The vehicle 1 includes not only a normal passenger car, but also a bus, a truck, and the like.

The camera 2, the camera ECU 3, the EUC 4, the brake ECU 5, the accelerator ECU 6, and the steering ECU 7 are mounted on the vehicle 1. Further, the vehicle 1 is provided with an engine, a brake, a steering, wheels, and the like. Control units such as the camera ECU 3, the EUC 4, the brake ECU 5, the accelerator ECU 6, and the steering ECU 7 are realized by hardware such as a microcomputer and software such as a program loaded into a memory.

The camera 2 is a stereo camera having two cameras installed in left and right positions of the vehicle 1. The camera 2 captures an image in front of the vehicle 1. A stereo image captured by two cameras of the camera 2 is outputted to the camera ECU 3. The camera ECU 3 has an image processing apparatus and performs image processing on the stereo image. Then, the camera ECU 3 outputs an image processing result to the ECU 4. For example, the camera ECU 3 calculates a distance from the vehicle 1 to an obstacle based on the image processing result.

The ECU 4 has a control unit that controls the vehicle 1 based on the image processing result. For example, the ECU 4 outputs a control signal to control the brake ECU 5, the accelerator ECU 6, and the steering ECU 7. The brake ECU 5 controls a brake of the vehicle 1 according to the control signal. The accelerator ECU 6 controls an accelerator of the vehicle 1. The steering ECU 7 controls a steering of the vehicle 1. The ECU 4 outputs the control signal according to the image processing result, so that it is possible to automatically control the vehicle 1 by means of a system instead of a human being.

(Control Configuration of Image Processing Apparatus)

Figure 2:
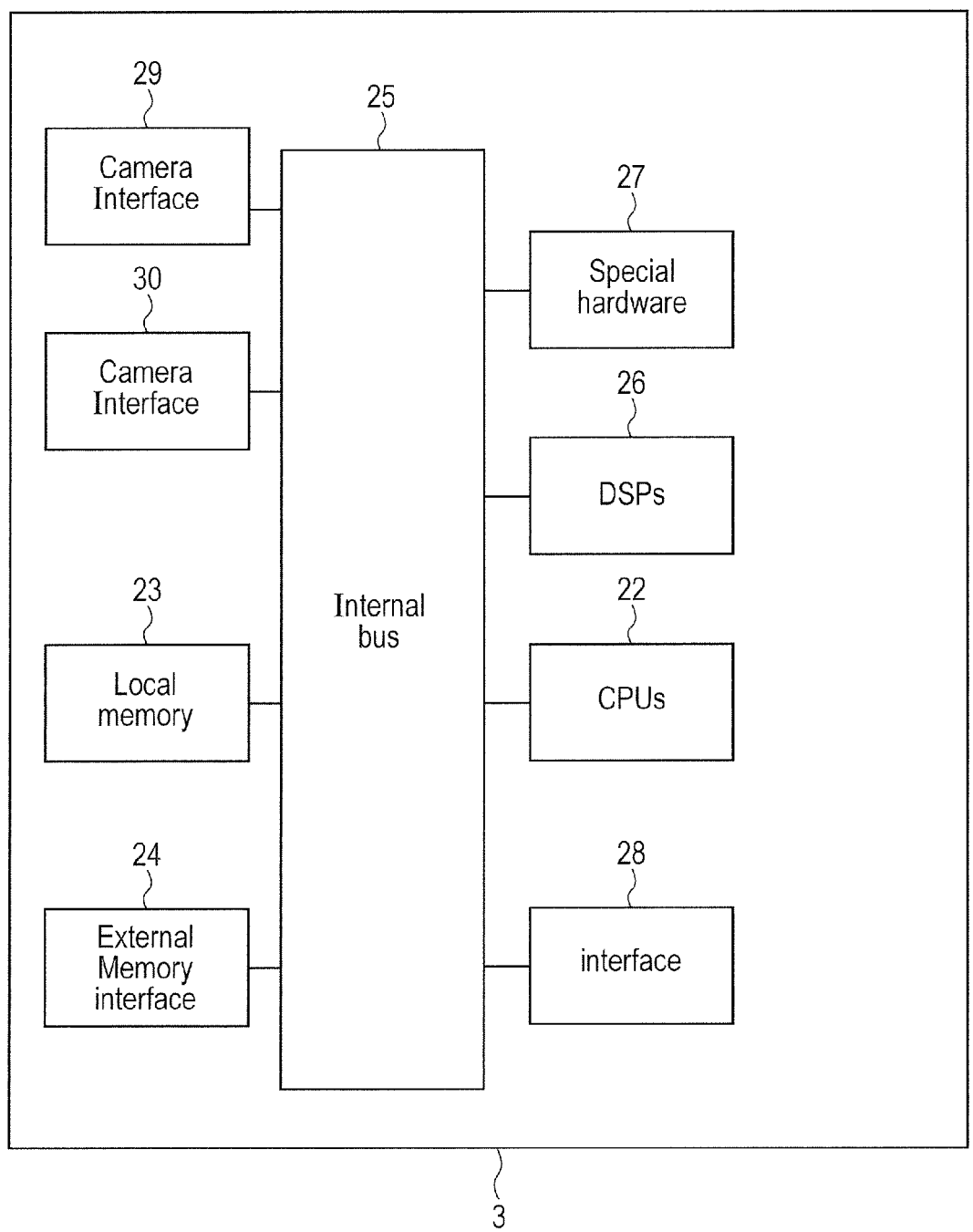
FIG. 2 is a control block diagram showing a circuit configuration of the image processing apparatus.

Next, the camera ECU 3, which is the image processing apparatus according to the embodiment, will be described with reference to FIG. 2. FIG. 2 is a control block diagram showing a circuit configuration of the camera ECU 3. The camera ECU 3 has at least one CPU (Central Processing Unit) 22, a local memory 23, an external memory interface 24, an internal bus 25, at least one DSP (Digital Signal Processor) 26, a special hardware 27, an interface 28, a camera interface 29, and a camera interface 30.

The camera interfaces 29 30 are interfaces for inputting an image from the camera 2. For example, an image captured by a left camera of the camera 2 is inputted into the camera ECU 3 through the camera interface 29. An image captured by a right camera of the camera 2 is inputted into the camera ECU 3 through the camera interface 30. Here, the image captured by the left camera of the camera 2 is defined as a first image and the image captured by the right camera of the camera 2 is defined as a second image. The number of pixels in the first image is the same as that in the second image.

The internal bus 25 has a bus line that couples the CPUs 22, the local memory 23, the external memory interface 24, the DSPs 26, the special hardware 27, the camera interface 29, and the camera interface 30 together. The interface 28 is an interface for inputting/outputting data from/to the ECU 4. The external memory interface 24 is an interface for inputting/outputting data from/to an external memory not shown in the drawings.

The local memory 23 stores pixel data included in the first image and the second image. The CPUs 22 integrally control each of the local memory 23, the external memory interface 24, the internal bus 25, the DSPs 26, the special hardware 27, the interface 28, the camera interface 29, and the camera interface 30.

The CPUs 22, the DSPs 26, and the special hardware 27 are hardware for implementing the image processing method according to the embodiment. That is, the image processing is performed in the CPUs 22, the DSPs 26, and the special hardware 27. The DSPs 26 and the special hardware 27 include a line memory which is an internal memory.

(Processing Flow)

Figure 3:
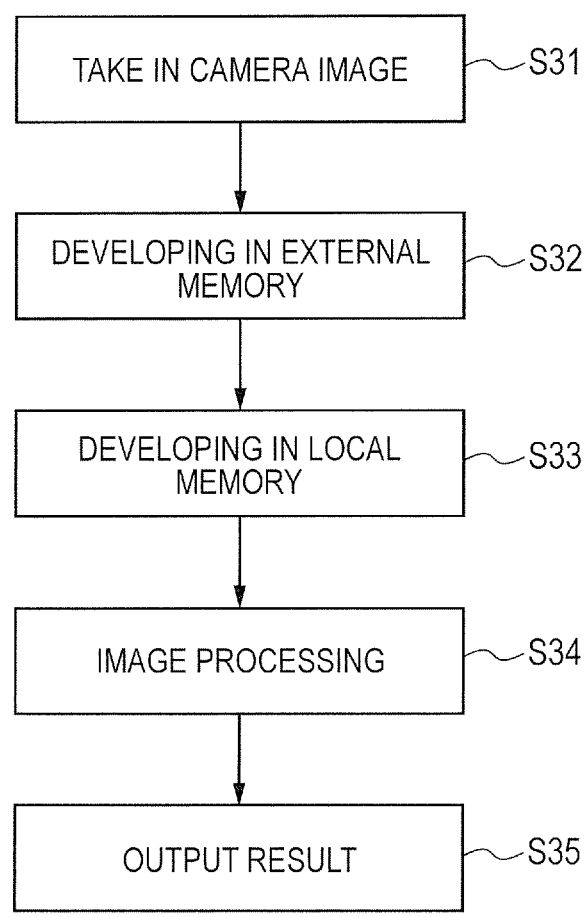
FIG. 3 is a flowchart showing an image processing method.

Next, an image processing method in the camera ECU 3 will be described with reference to FIG. 3. FIG. 3 is a flowchart showing the image processing method in the camera ECU 3.

First, the camera ECU 3 takes in a camera image (first image and second image) captured by the camera 2 through the camera interfaces 29 and 30 (S31). Then, the camera ECU 3 develops the camera image in an external memory through the external memory interface 24 (S32).

Next, the camera ECU 3 develops pixel data developed in the external memory in the local memory 23 (S33).

The camera ECU 3 performs image processing based on the pixel data stored in the local memory 23 (S34). Specifically, the image processing is performed when the CPUs 22, the DSPs 26, and the special hardware perform arithmetic operation processing on the pixel data.

The camera ECU 3 outputs an image processing result to the ECU 4 and the like (S35). For example, the camera ECU 3 generates an output image based on the first and the second images captured by the camera 2 in step S34. The output image is formed from image data whose number of pixels is the same as that of the first and the second images. Then, the camera ECU 3 outputs the output image to the ECU 4 as an image processing result. The number of pixels may be thinned or cut as needed.

The ECU 4 may control the brake ECU 5, the accelerator ECU 6, and the steering ECU 7 based on the image processing result. Thereby, the brake, the accelerator, and the steering are controlled. Therefore, it is possible to automatically control the vehicle 1. For example, a distance to an obstacle is obtained by the image processing apparatus. When it is determined that there is an obstacle nearby, the accelerator ECU 6 eases up on the accelerator and the brake ECU 5 applies the brake, so that the vehicle 1 decelerates. Alternatively, the steering ECU 7 controls the steering so as to avoid the obstacle.

(Processing Flow in General Configuration)

Figure 4:
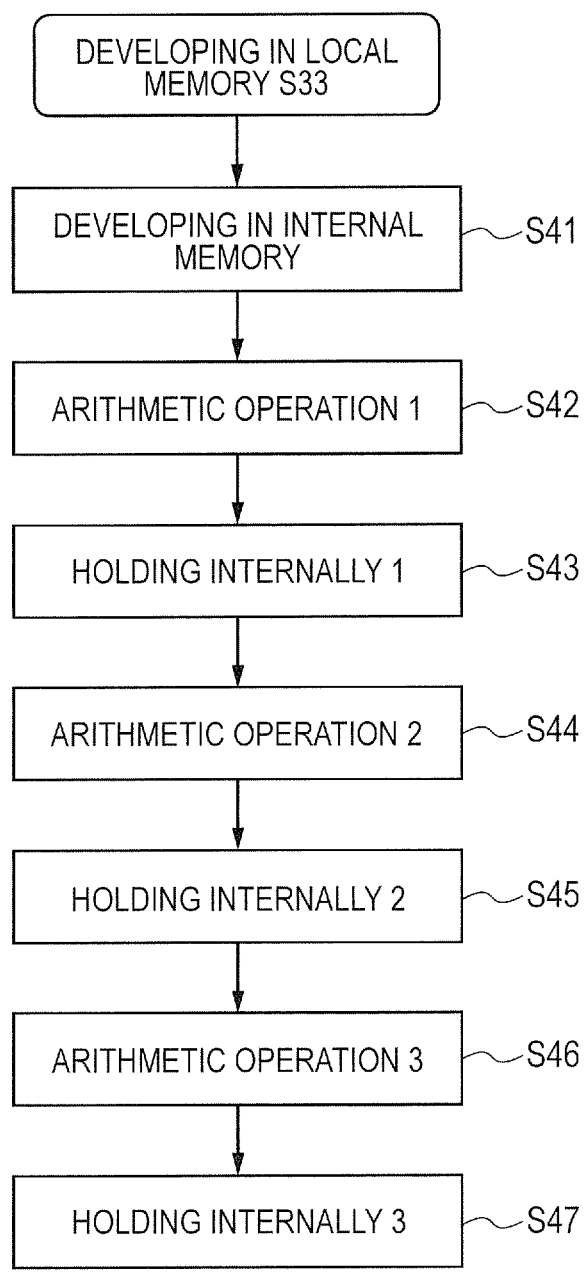
FIG. 4 is a processing flow showing image processing steps of the image processing method when using a general hardware configuration.

Next, the image processing in step S34 will be described with reference to FIG. 4. FIG. 4 shows a processing flow when the image processing in step S34 is performed by the general DSP 26 and the special hardware 27.

The camera ECU 3 develops the pixel data, which is developed in the local memory, in an internal memory (S41). The internal memory is the line memory built in the DSP 26 or the special hardware 27. The internal memory stores image data used in the image processing. Then, the camera ECU 3 performs an arithmetic operation 1 on the pixel data stored in the line memory (S42) and internally holds an arithmetic operation result of the arithmetic operation 1 in a register (S43).

Next, the camera ECU 3 performs an arithmetic operation 2 by using the arithmetic operation result of the arithmetic operation 1 which is held in the register (S44) and internally holds an arithmetic operation result of the arithmetic operation 2 in the register (S45). The camera ECU 3 performs an arithmetic operation 3 by using the arithmetic operation result of the arithmetic operation 2 which is held in the register (S46) and internally holds an arithmetic operation result of the arithmetic operation 3 in the register (S47).

FIG. 4 shows a flow in which the arithmetic operation and the internal holding are repeated three times. However, the number of repetition times is not limited to three. The arithmetic operations 1 to 3 are, for example, a multiply-accumulate (MAC) operation.

(Single Pipeline)

Figure 6:
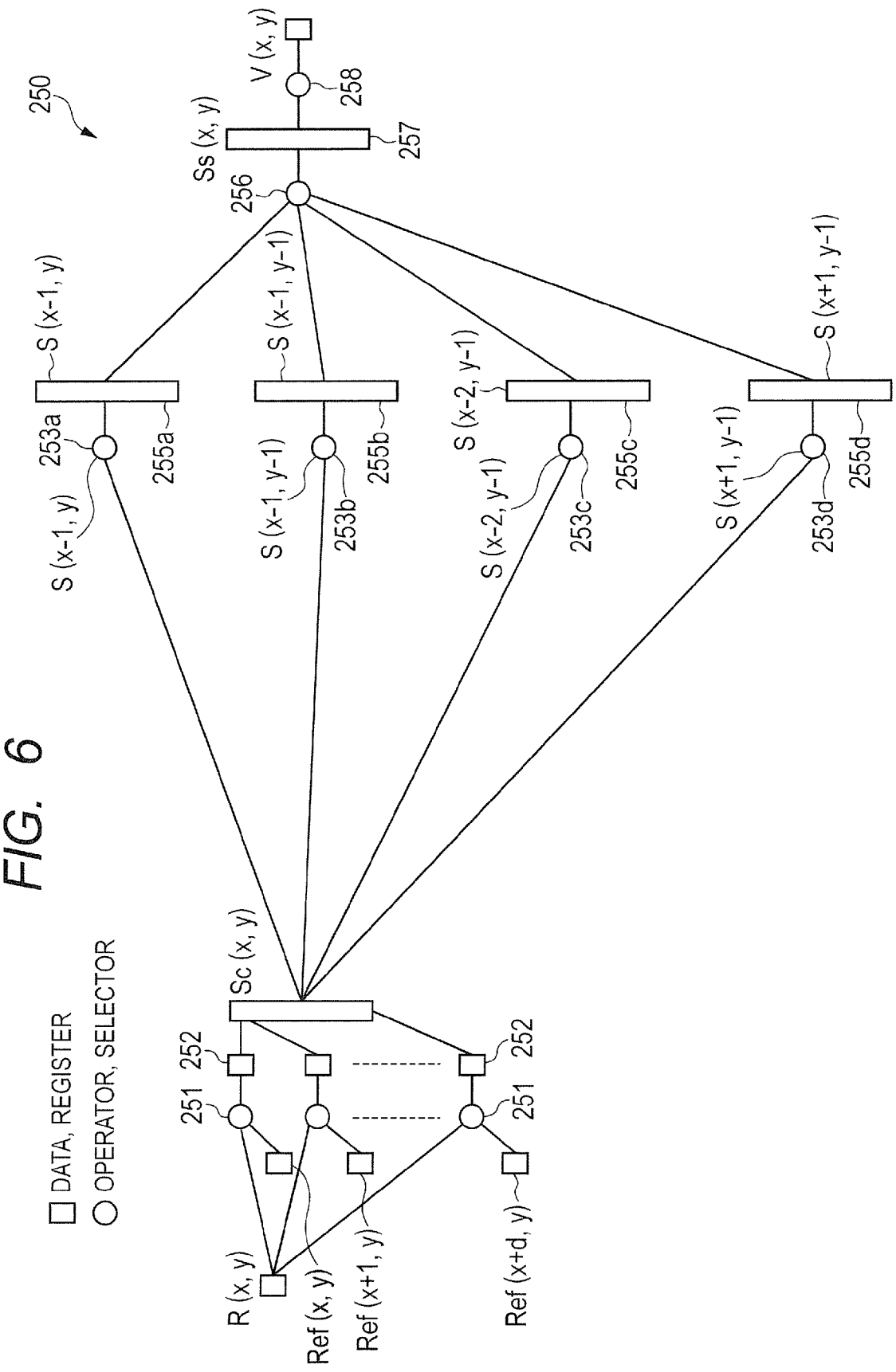
FIG. 6 is a diagram for explaining the image processing in FIG. 4.

Here, the processing flow shown in FIG. 4 will be described with reference to FIGS. 5 and 6. FIG. 5 is a diagram for explaining pixels of the first image and the second image. FIG. 6 is a diagram for explaining the arithmetic operations 1 to 3. Specifically, FIG. 6 shows processing performed in one stage of a pipeline.

As shown in FIG. 5, images are shown as a first image R and a second image Ref. A horizontal direction (cross direction) of the first image R and the second image Ref is defined as an X direction, and a vertical direction (longitudinal direction) of these is defined as a Y direction. Here, the first image R and the second image Ref are two-dimensional images having a total number of pixels D in the X direction (D is an integer greater than or equal to 2) and a total number of pixels H in the Y direction (H is an integer greater than or equal to 2).

Pixel coordinates of the first image R and the second image Ref are represented as (x, y). For example, a pixel of the pixel coordinates (x, y) in the first image R are represented as R(x, y). Similarly, a pixel of the pixel coordinates (x+1, y) in the second image Ref are represented as Ref(x+1, y). Here, x and y are arbitrary positive integers. Pixel data of each pixel of the first image R and the second image Ref is stored in the internal memory as described above.

Here, the pixel of the pixel coordinates (x, y) of the first image R is defined as a target pixel. Further, a pixel located around the pixel coordinates (x, y) is defined as a peripheral pixel. For example, the peripheral pixels are L pixels of Ref(x, y) to Ref(x+d, y). Here, d is an arbitrary integer. It is designed so that the peripheral pixels include the same pixel coordinates as those of the target pixel.

FIG. 6 shows a processing unit 250 that performs image processing on a target pixel of R(x, y). Specifically, FIG. 6 shows image processing for calculating output pixel data V(x, y) from pixel data of the target pixel R(x, y). In the description below, the pixel data of the target pixel is defined as target pixel data, and the pixel data of the peripheral pixels is defined as peripheral pixel data.

First, processing in the processing unit 250 will be described. A first operator 251 performs an arithmetic operation by using the target pixel data and the peripheral pixel data. The target pixel data is pixel data corresponding to the target pixel R(x, y) of the first image R. The peripheral pixel data is pixel data of pixels located around the coordinates (x, y) of the second image Ref. Specifically, the peripheral pixel data is pixel data corresponding to peripheral pixels Ref(x, y) to Ref (x+d, y). The number of peripheral pixels is L, so that L first operators 251 are provided. Here, L=d+1 (L and d are arbitrary positive integers). Each of the L first operators 251 performs arithmetic operation processing based on two pixel data. Thereby, L arithmetic operation results are obtained. The arithmetic operation performed by the first operator 251 corresponds to step S42 in FIG. 4.

Each of L registers 252 holds an arithmetic operation result. Here, the arithmetic operation results held by the L registers 252 are represented as a data array Sc(x, y). The data array Sc(x, y) is formed from the L arithmetic operation results. The L is defined as the number of amplifications in the first operator 251. Specifically, the number of amplifications L is the number of data generated for one target pixel R(x, y) in the first operator 251. For example, 128, 256, and the like are used as the number of amplifications L. Data holding by the register 252 corresponds to step S43 in FIG. 4.

Specifically, the data array Sc(x, y) is generated by sequentially changing the peripheral pixels with respect to one target pixel R(x, y). More specifically, pixel data of L peripheral pixels are sequentially inputted into the first operator 251. Then, the data array Sc(x, y) is generated based on amplification data generated by the first operator 251.

Then, the data array Sc(x, y) is inputted into second operators 253a to 253d. In FIG. 6, four second operators 253 are provided and the four second operators 253 are identified as the second operators 253a to 253d, respectively. Further, data arrays S(x−1, y), S(x−1, y−1), S(x−2, y−1), and S(x+1, y−1) are inputted into the second operators 253a to 253d, respectively, from a line memory or another stage of pipeline processing.

The second operators 253a to 253d perform a second arithmetic operation on the two inputted data arrays. Specifically, the second operators 253a to 253d update the data arrays S(x−1, y), S(x−1, y−1), S(x−2, y−1), and S(x+1, y−1) by using the data array Sc(x, y). The arithmetic operations performed by the second operators 253a to 253d correspond to step S44 in FIG. 4.

For example, the data array Sc(x, y) and the data array S(x−1, y) are inputted into the second operator 253a. Then, the second operator 253a updates the data array S(x−1, y) by using the data array Sc(x, y). Similarly, the second operators 253b to 253d update S(x−1, y−1), S(x−2, y−1), and S(x+1, y−1) by using the data array Sc(x, y). The data arrays S(x−1, y), S(x−1, y−1), S(x−2, y−1), and S(x+1, y−1), which are generated by the second operators 253a to 253d, are defined as propagation data.

The propagation data is calculated by using amplification data calculated from two pixels. Specifically, the second operators 253a to 253d perform an arithmetic operation by using amplification data for a target pixel and a reference pixel. For example, the coordinates of the target pixel of the second operator 253a is (x, y) and the coordinates of the reference pixel is (x−1, y). Similarly, the coordinates of the target pixel of the second operator 253b is (x, y) and the coordinates of the reference pixel is (x−1, y−1).

As described above, one amplification data is formed by L data arrays. Specifically, the second operators 253a to 253d calculate the propagation data by using the amplification data for the target pixel and the amplification data for the reference pixel which is propagated from the target pixel in the X direction or the Y direction.

The data arrays S(x−1, y), S(x−1, y−1), S(x−2, y−1), and S(x+1, y−1), which are updated by the second operators 253a to 253d, are held by registers 255a to 255d, respectively. Data holding by the registers 255a to 255d corresponds to step S45 in FIG. 4. Then, the registers 255a to 255d output the data arrays S(x−1, y), S(x−1, y−1), S(x−2, y−1), and S(x+1, y−1) to a third operator 256.

The third operator 256 performs a third arithmetic operation on the data arrays S(x−1, y), S(x−1, y−1), S(x−2, y−1), and S(x+1, y−1). By doing so, the third operator 256 calculates a data array Ss(x, y). The arithmetic operation performed by the third operator 256 corresponds to step S46 in FIG. 4. The data array Ss(x, y) generated by the third operator 256 is defined as selection candidate data.

The selection candidate data is calculated by using the propagation data calculated from a plurality of pixels. In FIG. 6, the selection candidate data of the target pixel R(x, y) is calculated by using the propagation data calculated from four pixels.

The third operator 256 outputs the data array Ss(x, y) to a register 257. The register 257 holds the data array Ss(x, y). The holding of the selection candidate data by the register 257 corresponds to step S47.

Then, the register 257 sequentially outputs the data array Ss(x, y) to the selector 258. The selector 258 selects optimal pixel data from the data array Ss(x, y) and outputs the pixel data as output pixel data Vx(x, y). Then, the output pixel data Vx(x, y) is developed in the local memory 23.

Here, the data capacities of the data arrays S(x−1, y), S(x−1, y−1), S(x−2, y−1), and S(x+1, y−1), which are the propagation data, tend to be large. For example, the capacity of the propagation data is represented as L*D*H.

Figure 7:
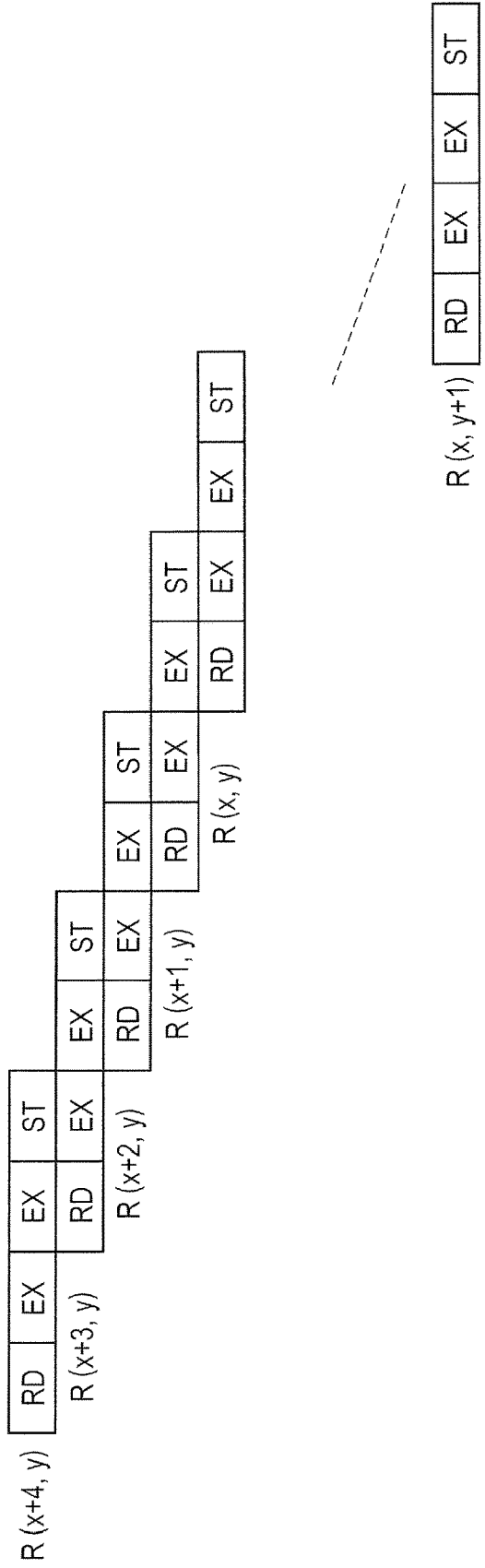
FIG. 7 is a diagram showing an execution flow in the processing shown in FIG. 6.

FIG. 7 shows an execution flow in the processing shown in FIG. 6. In FIG. 7, RD represents reading of pixel data from a line memory, EX represents an arithmetic operation performed by an operator, and ST represents writing to a register. EX is performed twice each time. However, EX may be performed once or three times or more.

One row in the horizontal direction corresponds to processing in each stage of a pipeline. For example, in the first stage of the pipeline, the reading RD, the arithmetic operation EX, the arithmetic operation EX, and the writing ST are performed by using R(x+4, y) as the target pixel, and in the second stage of the pipeline, the reading RD, the arithmetic operation EX, the arithmetic operation EX, and the writing ST are performed by using R(x+3, y) as the target pixel. That is to say, an execution timing of the arithmetic operation EX is shifted once for each stage.

After the pipeline processing of one row along the X direction is completed, the pipeline processing is shifted by one pixel in the Y direction and the pipeline processing of the next row is performed. In FIG. 7, after the pipeline processing of one row where the Y coordinate is y is completed, the pipeline processing of one row where the Y coordinate is y+1 is performed.

(Parallel Pipeline)

Figure 8:
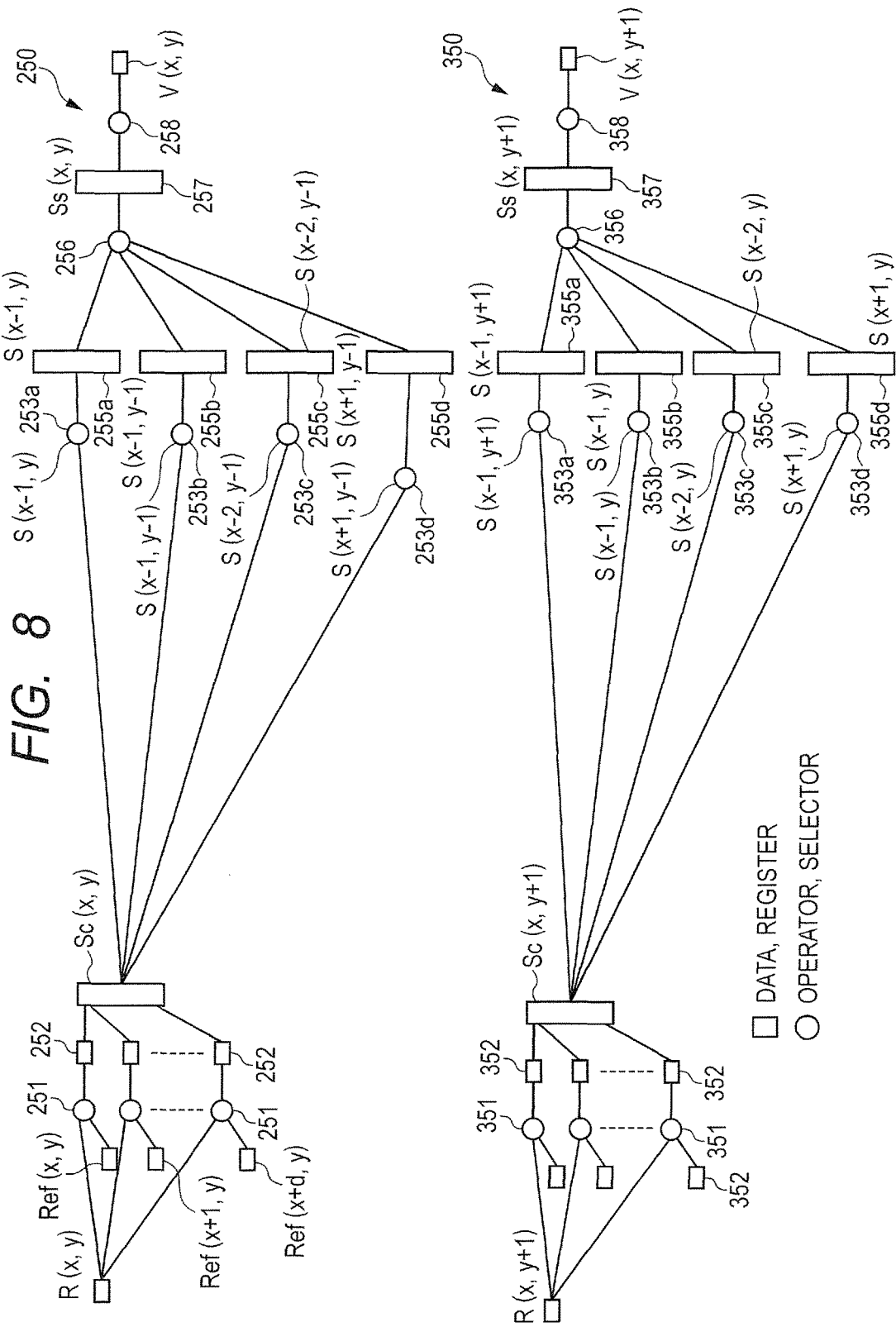
FIG. 8 is a diagram for explaining a configuration in which pipeline processing in FIG. 6 is parallelized.

Next, an example in which the processing shown in FIG. 6 is processed by two pipelines arranged in parallel will be described with reference to FIG. 8. In FIG. 8, a processing unit 250 of a first pipeline and a processing unit 350 of a second pipeline perform processing in parallel.

The processing unit 250 and the processing unit 350 have the same configuration. A first operator 251, a register 252, a second operator 253, a register 255, a third operator 256, a register 257, and a selector 258 of the processing unit 250 respectively correspond to a first operator 351, a register 352, a second operator 353, a register 355, a third operator 356, a register 357, and a selector 358 of the processing unit 350. The processing of the processing unit 250 and the processing unit 350 is the same as the processing in FIG. 6, so that the description thereof is omitted.

The processing unit 250 of the first pipeline defines R(x, y) as the target pixel and the processing unit 350 of the second pipeline defines R(x, y+1) as the target pixel. In other words, the processing unit 250 of the first pipeline and the processing unit 350 of the second pipeline define pixels one pixel shifted from each other in the Y direction as the target pixels. Therefore, the peripheral pixels are also one pixel shifted from each other in the Y direction.

Figure 9:
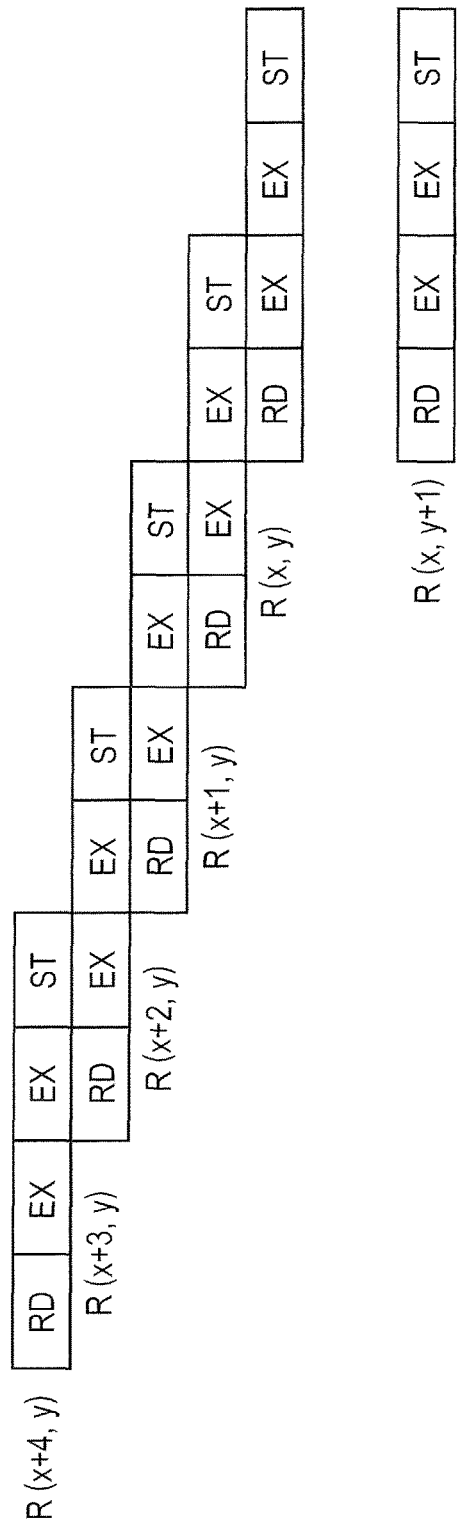
FIG. 9 is a diagram showing an execution flow in the processing shown in FIG. 8.

FIG. 9 is shows an execution flow in the processing shown in FIG. 8. In FIG. 9, RD represents reading of pixel data from a line memory, EX represents an arithmetic operation performed by an operator, and ST represents writing to a register. EX is performed twice each time. However, EX may be performed once or three times or more.

In FIG. 8, two pipelines perform pipeline processing in parallel. Specifically, the processing unit 250 of the first pipeline and the processing unit 350 of the second pipeline perform processing at the same time.

For example, when the processing unit 250 of the first pipeline performs processing by defining R(x, y) as the target pixel, the processing unit 350 of the second pipeline performs processing by defining R(x, y+1) as the target pixel. In other words, in FIG. 8, the target pixels are shifted from each other by one pixel. Therefore, as shown in FIG. 9, the processing where R(x, y) is defined as the target pixel and the processing where R(x, y+1) is defined as the target pixel are performed at the same time. That is to say, a timing (RD) when the processing unit 250 of the first pipeline reads pixel data of the target pixel R(x, y) and a timing (RD) when the processing unit 350 of the second pipeline reads pixel data of the target pixel R(x, y+1) are the same.

Therefore, it is difficult for the parallel pipeline configuration shown in FIG. 8 to use an arithmetic operation result of the other pipeline. In other words, it is difficult to use propagation data obtained by the processing unit 250 of the first pipeline for the processing of the processing unit 350 of the second pipeline. Specifically, the propagation data in the processing where the target pixel is R(x, y) in the processing unit 250 of the first pipeline cannot be used for the processing where the target pixel is the target pixel R(x, y+1) in the processing unit 350 of the second pipeline.

(Schematic Configuration of Processing Unit)

Figure 10:
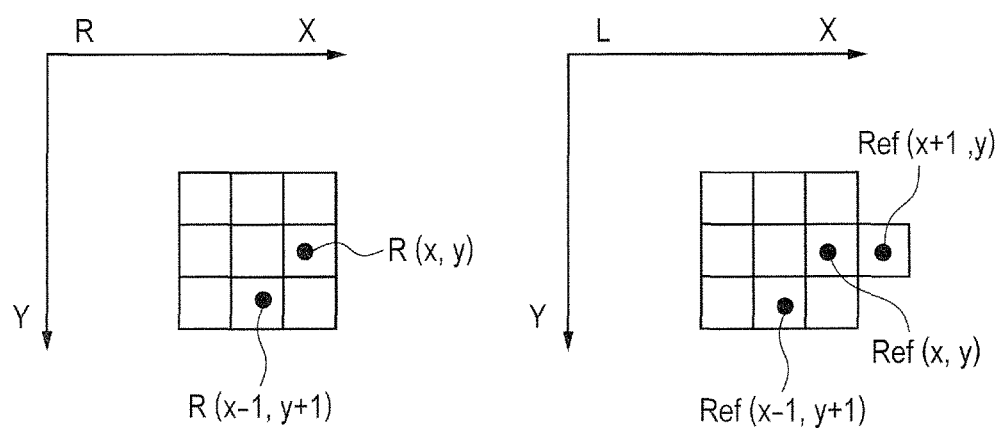
FIG. 10 is a diagram for explaining a target pixel and peripheral pixels in an embodiment.
Figure 11:
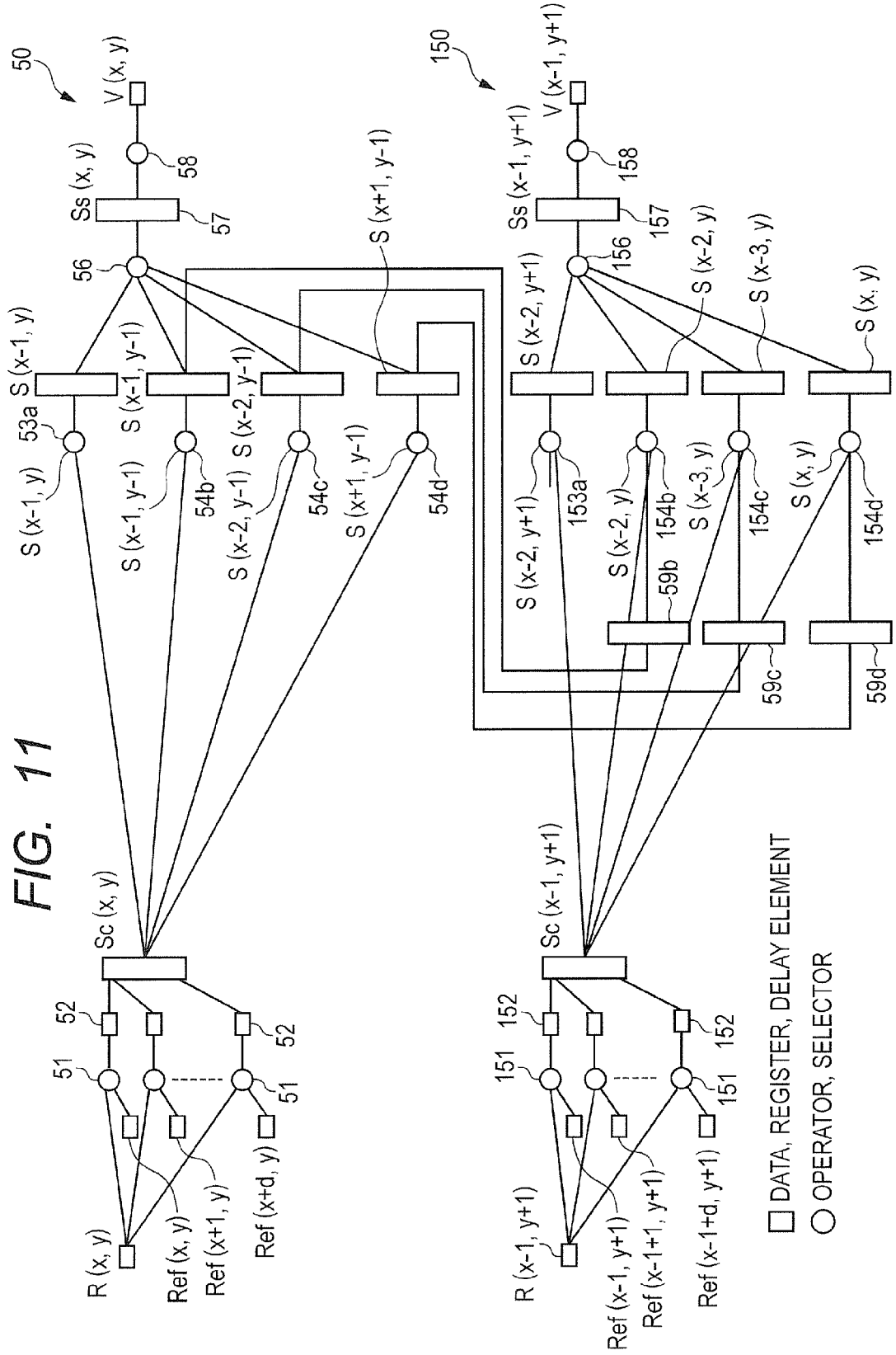
FIG. 11 is a conceptual diagram for explaining processing in the image processing apparatus according to the embodiment.

Therefore, the embodiment uses an image processing apparatus and an image processing method described below. A configuration of a processing unit of the image processing apparatus according to the embodiment will be described with reference to FIGS. 10 and 11. FIG. 10 is a diagram for explaining a target pixel and peripheral pixels of two processing units of pipelines arranged in parallel. FIG. 11 is a diagram showing an outline of a processing unit 50 of a first pipeline and a processing unit 150 of a second pipeline.

As described above, the first pipeline and the second pipeline perform pipeline processing in parallel. For example, the first pipeline and the second pipeline perform the pipeline processing by using pixels, which are one pixel shifted from each other in the Y direction, as target pixels. The first pipeline has multi-stage processing units to perform the pipeline processing. Similarly, the second pipeline has multi-stage processing units to perform the pipeline processing. The processing unit included in the first pipeline uses a pixel, whose Y coordinate is y, as the target pixel. The processing unit included in the second pipeline uses a pixel, whose Y coordinate is y+1, as the target pixel.

FIG. 11 shows a one-stage processing unit 50 in the first pipeline and a one-stage processing unit 150 in the second pipeline. As shown in FIGS. 10 and 11, the target pixel of the processing unit 50 is R(x, y) and the target pixel of the processing unit 150 is R(x−1, y+1).

The processing unit 50 includes a first operator 51, a register 52, a second operator 53a, third operators 54b to 54d, a fourth operator 56, a selector 58. The processing unit 150 includes a first operator 151, a register 152, a second operator 153a, third operators 154b to 154d, a fourth operator 156, a register 157, and a selector 158, and delay elements 59b to 59d.

First, processing in the processing unit 50 will be described. The first operator 51 performs a first arithmetic operation by using target pixel data and peripheral pixel data. The target pixel data is pixel data corresponding to the target pixel R(x, y) of the first image R. The peripheral pixel data is pixel data of pixels located around the coordinates (x, y) of the second image Ref. Specifically, the peripheral pixel data is pixel data corresponding to peripheral pixels Ref(x, y) to Ref (x+d, y). The number of peripheral pixels is L, so that L first operators 51 are provided. Each of the L first operators 51 performs arithmetic operation processing based on two pixel data. Thereby, L arithmetic operation results are obtained.

Each of L registers 52 holds an arithmetic operation result. Here, the arithmetic operation results held by the L registers 52 are represented as a data array Sc(x, y). The data array Sc(x, y) is formed from the L arithmetic operation results. The L is defined as the number of amplifications in the first operator 51. Specifically, the number of amplifications L is the number of data generated for one target pixel R(x, y) in the first operator 51. For example, 128, 256, and the like are used as the number of amplifications L.

Specifically, the data array Sc(x, y) is generated by sequentially changing the peripheral pixels with respect to one target pixel R(x, y). More specifically, pixel data of L peripheral pixels are sequentially inputted into the operator 51. Then, the data array Sc(x, y) is generated based on amplification data generated by the first operator 51.

Then, the data array Sc(x, y) is inputted into the second operator 53a and the third operators 54b to 54d. In FIG. 11, three third operators 54 are provided and they are identified as the third operators 54b to 54d. Further, the data arrays S(x−1, y), S(x−1, y−1), S(x−2, y−1), and S(x+1, y−1) are respectively inputted into the second operator 53a and the third operators 54b to 54d from a line memory or another stage of the pipeline processing.

The second operator 53a and the third operators 54b to 54d perform a second arithmetic operation or a third arithmetic operation on two inputted data arrays. Specifically, the second operator 53a and the third operators 54b to 54d update the data arrays S(x−1, y), S(x−1, y−1), S(x−2, y−1), and S(x+1, y−1) by using the data array Sc(x, y).

For example, the data array Sc(x, y) and the data array S(x−1, y) are inputted into the second operator 53a. Then, the second operator 53a updates the data array S(x−1, y) by using the data array Sc(x, y). This is a second arithmetic operation.

Similarly, the third operators 54b to 54d update S(x−1, y−1), S(x−2, y−1), and S(x+1, y−1) by using the data array Sc(x, y). This is a third arithmetic operation. The data arrays S(x−1, y), S(x−1, y−1), S(x−2, y−1), and S(x+1, y−1), which are generated by the second operator 53a and the third operators 54b to 54d, are defined as propagation data. The data arrays S(x−1, y), S(x−1, y−1), S(x−2, y−1), and S(x+1, y−1) are inputted into the fourth operator 56.

The third operators 54b to 54d perform the third arithmetic operation by using amplification data of two pixels. Specifically, the third operators 54b to 54d perform the third arithmetic operation by using amplification data of the target pixel and amplification data of the reference pixel. The target pixel of the third operator 54b is R(x, y) and the reference pixel of the third operator 54b is R(x−1, y−1). The target pixel of the third operator 54c is R(x, y) and the reference pixel of the third operator 54c is R(x−2, y−1). The target pixel of the third operator 54d is R(x, y) and the reference pixel of the third operator 54d is R(x+1, y−1).

The fourth operator 56 performs a fourth arithmetic operation on the data arrays S(x−1, y), S(x−1, y−1), S(x−2, y−1), and S(x+1, y−1). By doing so, the fourth operator 56 calculates the data array Ss(x, y). The fourth arithmetic operation performed by the fourth operator 56 corresponds to step S46 in FIG. 4. The data array Ss(x, y) generated by the fourth operator 56 is defined as selection candidate data.

The selection candidate data is calculated by using propagation data calculated from a plurality of pixels. In FIG. 6, selection data of the target pixel R(x, y) is calculated by using propagation data calculated from four pixels.

The fourth operator 56 outputs the data array Ss (x, y) to a register 57. The register 57 holds the data array Ss(x, y). Then, the register 57 sequentially outputs the data array Ss (x, y) to the selector 58. The selector 58 selects optimal pixel data from the data array Ss (x, y) and outputs the pixel data as output pixel data Vx(x, y). Specifically, the selector 58 selects the lowest cost data from a plurality of data included in the data array Ss(x, y).

Next, processing in the processing unit 150 will be described. The first operator 151 performs a first arithmetic operation by using target pixel data and peripheral pixel data. The target pixel data is pixel data corresponding to the target pixel R(x+1, y+1) of the first image R. The peripheral pixel data is pixel data of pixels located around the coordinates (x+1, y+1) of the second image Ref. Specifically, the peripheral pixel data is pixel data corresponding to peripheral pixels Ref (x−1, y) to Ref (x−1+d, y). The number of peripheral pixels is L, so that L first operators 51 are provided. Each of the L first operators 51 performs arithmetic operation processing based on two pixel data. Thereby, L arithmetic operation results are obtained.

Each of L registers 152 holds an arithmetic operation result. Here, the arithmetic operation results held by the L registers 152 are represented as a data array Sc(x−1, y+1). The data array Sc(x−1, y+1) is formed from the L arithmetic operation results. The L is defined as the number of amplifications in the first operator 151. Specifically, the number of amplifications L is the number of data generated for one target pixel R (x−1, y+1) in the first operator 151. For example, the number of amplifications L has a value of 128, 256, and the like. The number of amplifications of the first operator 51 and the number of amplifications of the first operator 151 are the same.

Specifically, the data array Sc(x−1, y+1) is generated by sequentially changing the peripheral pixels with respect to one target pixel R(x−1, y+1). More specifically, pixel data of L peripheral pixels are sequentially inputted into the operator 151. Then, the data array Sc(x−1, y+1) is generated based on amplification data generated by the first operator 151.

Then, the data array Sc (x−1, y+1) is inputted into the second operator 153a and the third operators 154b to 154d. In FIG. 11, three third operators 154 are provided and they are identified as the third operators 154b to 154d. Further, the data arrays S(x−2, y+1), S(x−2, y), S(x−3, y), and S(x, y) are respectively inputted into the second operator 153a and the third operators 154b to 154d from a line memory or another stage of the pipeline processing.

The second operator 153a and the third operators 154b to 154d perform a second arithmetic operation or a third arithmetic operation on two inputted data arrays. Specifically, the second operator 153a and the third operators 154b to 154d update the data arrays S(x−2, y+1), S(x−2, y), S(x−3, y), and S(x, y) by using the data array Sc(x−1, y+1).

For example, the data array Sc(x−1, y+1) and the data array S(x−2, y+1) are inputted into the second operator 153a. Then, the second operator 153a updates the data array S(x−2, y+1) by using the data array Sc(x−1, y+1). This is a second arithmetic operation.

Similarly, the third operators 154b to 154d update S(x−2, y), S(x−3, y), and S(x, y) by using the data array Sc(x−1, y+1). This is a third arithmetic operation. The data arrays S(x−2, y+1), S(x−2, y), S(x−3, y), and S(x, y), which are generated by the second operator 153a and the third operators 154b to 154d, are defined as propagation data. The data arrays S(x−2, y), S(x−2, y), S(x−3, y), and S(x, y) are inputted into the fourth operator 156.

The third operators 154b to 154d perform the third arithmetic operation by using amplification data of two pixels. Specifically, the third operators 154b to 154d perform the third arithmetic operation by using amplification data of the target pixel and amplification data of the reference pixel. The target pixel of the third operator 154b is R(x−1, y+1) and the reference pixel of the third operator 154b is R(x−2, y). The target pixel of the third operator 154c is R(x−1, y+1) and the reference pixel of the third operator 154c is R(x−3, y). The target pixel of the third operator 154d is R(x−1, y+1) and the reference pixel of the third operator 154d is R(x, y).

Further, in the embodiment, the data arrays S(x−1, y−1), S(x−2, y−1), and S(x+1, y−1) generated by the processing unit 50 are inputted into the third operators 154b to 154d through the delay elements 59b to 59d. Specifically, S(x−1, y−1) generated by the third operator 54b is inputted into the third operator 154b through the delay element 59b. S(x−2, y−1) generated by the third operator 54c is inputted into the third operator 154c through the delay element 59c. S(x+1, y−1) generated by the third operator 54d is inputted into the third operator 154d through the delay element 59d.

The fourth operator 156 performs a fourth arithmetic operation on S(x−2, y+1), S(x−2, y), S(x−3, y), and S(x, y). By doing so, the fourth operator 156 calculates the data array Ss(x−1, y+1). The data array Ss(x−1, y+1) generated by the fourth operator 156 is defined as selection candidate data.

The fourth operator 156 outputs the calculated data array Ss(x−1, y+1) to the register 157. The register 157 holds the data array Ss(x−1, y+1). Then, the register 157 sequentially outputs the data array Ss to the selector 158. The selector 158 selects optimal pixel data from the data array Ss(x−1, y+1) and outputs the pixel data as output pixel data Vx(x−1, y+1). For example, the selector 58 selects the lowest cost data from a plurality of data included in the data array Ss(x−1, y+1).

In this way, the propagation data generated by the third operators 54b to 54d is inputted into the third operators 154b to 154d through the delay elements 59b to 59d. That is to say, the third operators 154b to 154d perform the third arithmetic operation by using arithmetic operation results in the processing unit 50 of the first pipelines arranged in parallel. At this time, the timings when the propagation data is inputted into the third operators 154b to 154d are adjusted by the delay elements 59b to 59d. By doing so, it is possible to reduce the number of registers that hold the propagation data.

(Configuration of Main Part of Image Processing Apparatus)

Figure 12:
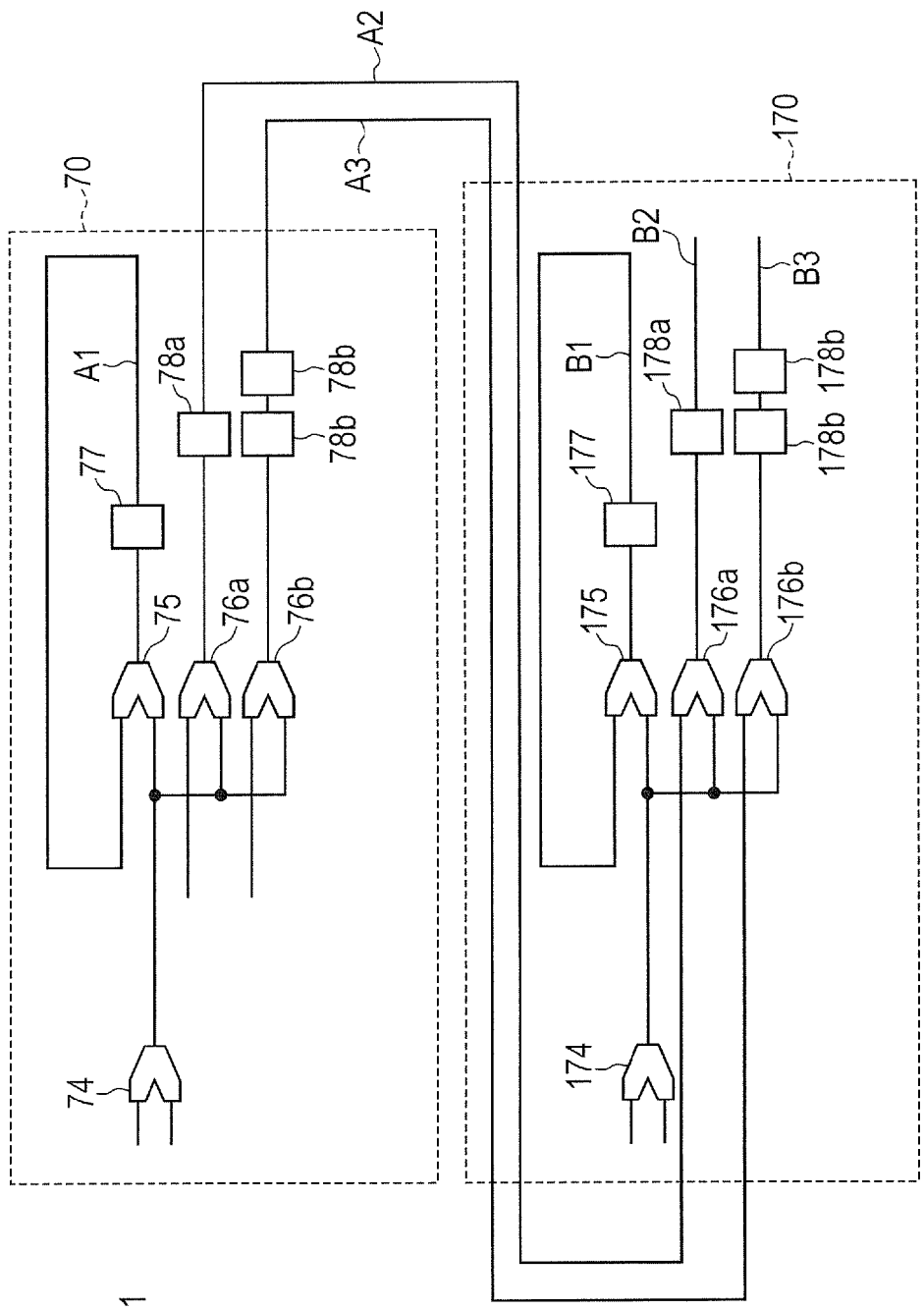
FIG. 12 is a diagram showing a configuration of a main part of the image processing apparatus.

Next, a detailed configuration of the image processing apparatus according to the embodiment will be described with reference to FIG. 12. FIG. 12 is a diagram showing a configuration of a main part of the image processing apparatus.

The image processing apparatus 700 includes a line memory 81, a line memory control circuit 82, a delay adjustment control circuit 83, a processing unit 70, and a processing unit 170. The processing unit 70 represents a one-stage processing unit included in a first pipeline. The processing unit 170 represents a one-stage processing unit included in a second pipeline. The first pipeline and the second pipeline perform pipeline processing in parallel.

The processing unit 70 has a first operator 74, a second operator 75, third operators 76a and 76b, a register 77, and delay elements 78a and 78b. The processing unit 170 has a first operator 174, a second operator 175, third operators 176a and 176b, a register 177, and delay elements 178a and 178b.

The line memory 81 stores pixel data of a first image and a second image. In the line memory 81, the pixel data included in the first image and the second image is developed. The line memory control circuit 82 controls the line memory 81. The line memory control circuit 82 controls data writing from the local memory 23 to the line memory 81. Further, the line memory control circuit 82 controls data reading from the line memory 81 to the processing units 70 and 170.

Specifically, the line memory control circuit 82 reads pixel data included in the first image and the second image, on which the pipeline processing is performed, from the local memory 23 and writes the pixel data into the line memory 81. The line memory control circuit 82 reads pixel data necessary for the processing of the processing unit 70 and the processing unit 170 from the line memory 81 at an appropriate timing. When the image processing apparatus performs semi-global matching, the line memory 81 stores pixel data of a part of the first and the second images. Then, the line memory control circuit 82 supplies the pixel data read from the line memory 81 to the processing units 70 and 170. The delay adjustment control circuit 83 controls the amount of delay of the delay elements 78a, 78b, 178a, and 178b described later.

The pixel data read from the line memory 81 is inputted into the first operators 74 and 174. The first operators 74 and 174 perform arithmetic operation processing on the pixel data. Specifically, pixel data of a target pixel and pixel data of peripheral pixels are inputted into the first operators 74 and 174. The first operators 74 and 174 respectively correspond to the first operator 51 and the first operator 151 shown in FIG. 11.

The pixel data of a plurality of peripheral pixels is sequentially inputted into the first operators 74 and 174. Then, the first operators 74 and 174 input the pixel data of the target pixel and an arithmetic operation result based on the pixel data of the target pixel to the second operator 75 and the third operators 76a and 76b. The arithmetic operation result of the first operator 74 is first intermediate data. The first intermediate data corresponds to the amplification data described above.

The first operators 74 and 174 sequentially performs arithmetic operations by using pixel data of the peripheral pixels, which are sequentially inputted. That is, the first operators 74 and 174 sequentially output arithmetic operation results corresponding to the pixel data of the peripheral pixels, which are sequentially inputted. For example, the number of the peripheral pixels for the first operators 74 and 174 is L. Therefore, the first operators 74 and 174 output L data in time series. The first operators 74 and 174 perform averaging and the like on the sequentially inputted pixel data.

The second operators 75 and 175 perform arithmetic operation processing based on L data that are sequentially inputted. Arithmetic operation results of the second operators 75 and 175 are defined as second intermediate data. The second intermediate data correspond to the propagation data described above. The second intermediate data are held by the registers 77 and 177, respectively. Then, the second operators 75 and 175 perform a second arithmetic operation based on the second intermediate data held by the registers 77 and 177 and the first intermediate data to be inputted next. In other words, the second operator 75 performs the second arithmetic operation by using the second intermediate data based on the first intermediate data that has already been generated and the first intermediate data that is newly generated. For example, the second arithmetic operation is a multiply-accumulate operation.

Then, the arithmetic operation results of the second operators 75 and 175 are held by the registers 77 and 177 as new second intermediate data. The second operators 75 and 175 repeat the second arithmetic operation for the number of times corresponding to the number (L) of the first intermediate data. The second operators 75 and 175 respectively correspond to the second operators 53a and 153a shown in FIG. 11.

Similarly, the first intermediate data from the first operator 74 are sequentially inputted into the third operators 76a and 76b. Further, first intermediate data from another processing unit are sequentially inputted into the third operators 76a and 76b. Then, the third operators 76a and 76b perform a third arithmetic operation based on the two intermediate data. The third operators 76a and 76b sequentially perform the third arithmetic operation on the first intermediate data that are sequentially inputted. In the above description, the first intermediate data from another processing unit are inputted into the third operators 76a and 76b. However, the pixel data in the line memory 81 may be inputted into the third operators 76a and 76b.

Specifically, the third operators 76a and 76b perform the third arithmetic operation by using the first intermediate data of the target pixel and the first intermediate data of the peripheral pixels. As described above, L data are included in the first intermediate data. Similarly, L data are included in the first intermediate data of the peripheral pixels. The third operators 76a and 76b sequentially perform arithmetic operations on data included in the first intermediate data of the target pixel and data included in the first intermediate data of the peripheral pixels.

The arithmetic operation results of the third operators 76a and 76b are defined as third intermediate data. The third intermediate data correspond to the propagation data described above. The third intermediate data calculated by the third operator 76a is referred to as A2 and the third intermediate data calculated by the third operator 76b is referred to as A3. The third intermediate data A2 is inputted into the third operator 176a through the delay element 78a. The third intermediate data A3 is inputted into the third operator 176b through the delay element 78b.

The third operators 176a and 176b perform the third arithmetic operation in the same manner as the third operators 76a and 76b. Specifically, the first intermediate data from the first operator 174 and the third intermediate data A2 from the third operator 76a are sequentially inputted into the third operator 176a. The third operator 176a performs the third arithmetic operation based on the sequentially inputted two data. Similarly, the first intermediate data from the first operator 174 and the third intermediate data A3 from the third operator 76b are sequentially inputted into the third operator 176b. The third operator 176b performs the third arithmetic operation based on the sequentially inputted two data.

Data calculated by the third operator 176a is defined as third intermediate data B2, and data calculated by the third operator 176b is defined as third intermediate data B3. The third intermediate data B2 and B3 are outputted to a processing unit of another pipeline through the delay elements 178a and 178b.

Although not shown in FIG. 12, the processing unit 70 generates output pixel data by using the second intermediate data calculated by the second operator 75 and the third intermediate data A2 and A3 calculated by the third operators 76a and 76b. Similarly, the processing unit 170 generates output pixel data by using the second intermediate data calculated by the second operator 175 and the third intermediate data B2 and B3 calculated by the third operators 176a and 176b. The processing of generating the output pixel data is the same as the processing performed by the fourth operators 56 and 156 and the selectors 58 and 158 shown in FIG. 11, so that the description thereof is omitted.

Figure 13:
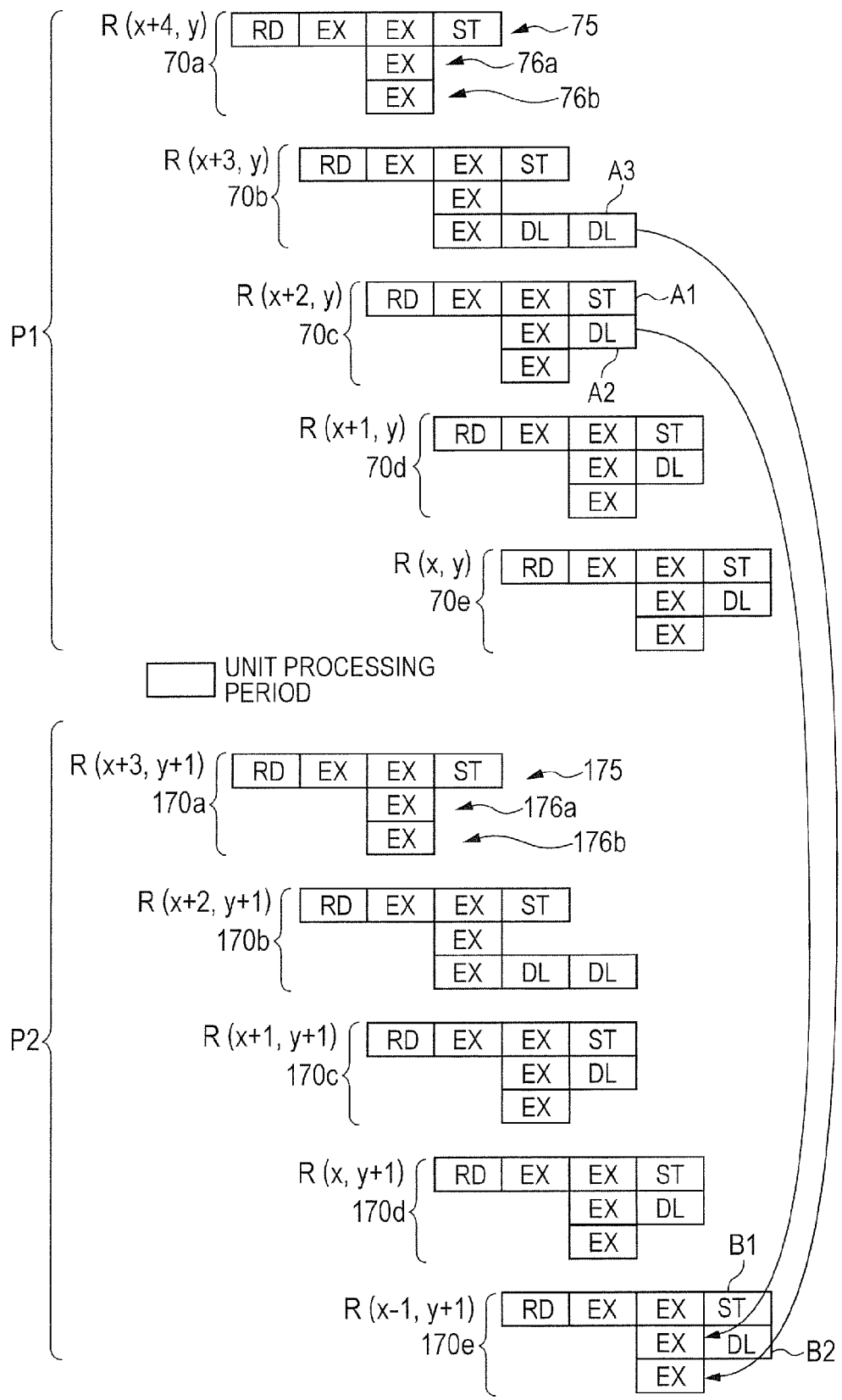
FIG. 13 is a diagram showing an execution flow in the processing shown in FIG. 12.

FIG. 13 shows an execution flow in the processing shown in FIG. 12. In FIG. 13, RD represents reading of pixel data from a line memory, EX represents an arithmetic operation performed by an operator, and ST represents writing to a register. Further, FIG. 13 shows pipeline processing in a first pipeline P1 and pipeline processing in a second pipeline P2. Further, FIG. 13 shows five-stage processing units 70a to 70e included in the first pipeline P1 and five-stage processing units 170a to 170e included in the second pipeline P2.

Regarding the five-stage processing units 70a to 70e, the processing unit 70a, the processing unit 70b, the processing unit 70c, the processing unit 70d, and the processing unit 70e are located in order from the most pre-stage side. Regarding the five-stage processing units 170a to 170e, the processing unit 170a, the processing unit 170b, the processing unit 170c, the processing unit 170d, and the processing unit 170e are located in order from the most pre-stage side. That is, the most pre-stage processing units in the pipelines P1 and P2 are the processing units 70a and 170a. Intermediate data is outputted from a pre-stage processing unit to a post-stage processing unit. The post-stage processing unit performs an arithmetic operation by using the intermediate data calculated by the pre-stage processing unit.

The Y coordinate of the target pixel in the first pipeline P1 is y, and the Y coordinate of the target pixel in the second pipeline P2 is y+1. In other words, the Y coordinate is different between pipelines in parallel. For example, in the processing units 70a to 70e of the first pipeline P1, the Y coordinate of the target pixel is y, and in the processing units 170a to 170e of the second pipeline P2, the Y coordinate of the target pixel is y+1. In one pipeline, in the multi-stage processing units, the X coordinate of the target pixel varies by one from the X coordinate of the neighboring target pixel. For example, the X coordinates of the processing units 70a, 70b, 70c, 70d, and 70e are x+4, x+3, x+2, x+1, and x+0.

The timing of the processing on the target pixel (x+4, y) of the processing unit 70a is the same as the timing of the processing on the target pixel (x+3, y+1) of the processing unit 170a. In the first pipe line P1, the processing timings of the processing units 70a to 70e are shifted from each other by one unit processing period. Here, the one unit processing period corresponds to a period of time in which one unit processing shown by one field in FIG. 13 is performed. In other words, the one unit processing period corresponds to a period of time in which any one of the reading RD, the arithmetic operation EX, and the writing ST is performed.

Further, in each processing unit, the uppermost row corresponds to the second intermediate data and the second uppermost row corresponds to the third intermediate data calculated by the third operator 76a or 176a. The third uppermost row corresponds to the third intermediate data calculated by the third operator 76b or 176b. Each processing unit is formed from four unit processing periods including (1) reading RD, (2) first arithmetic operation EX, (3) second arithmetic operation or third arithmetic operation EX, and (4) writing ST.

As shown in FIG. 13, in the one processing unit 70, the timings of the arithmetic operation EX of the second operator 75 and the third operators 76a and 76b are the same. In the one processing unit 170, the timings of the arithmetic operation EX of the second operator 175 and the third operators 176a and 176b are the same. Therefore, in one processing unit, the second intermediate data and the two third intermediate data are generated at the same time.

In the processing unit 70b, processing for the target pixel R(x+3, y) is performed. The third intermediate data A3 generated by the third operator 76b of the processing unit 70b is inputted into the third operator 76b of the processing unit 170e through a delay of two unit processing periods.

In the processing unit 70c, processing for the target pixel R(x+2, y) is performed. The third intermediate data A2 generated by the third operator 76a of the processing unit 70c is inputted into the third operator 76a of the processing unit 170e through a delay of one unit processing period. The processing unit 170e performs processing for the target pixel R(x−1, y+1). The amount of delay by the delay element 78b is greater than the amount of delay by the delay element 78a.

In this way, different delays are given to the third intermediate data A2 and A3, so that it is possible to use the third intermediate data A2 and A3 in the third arithmetic operation in the processing unit 170e. That is, the third operators 76a and 76b of the processing unit 170e included in the second pipeline P2 can use the third intermediate data A2 and A3 generated in the first pipeline P1. In other words, the third intermediate data A2 and A3 are inputted/outputted between the pipelines. By doing so, it is possible to reduce the capacity of a register for holding the third intermediate data.

Although FIG. 13 shows only an example in which the third intermediate data A2 and A3 are inputted into the processing unit 170e, it is possible to input/output the third intermediate data A2 and A3 between a plurality of processing units 70 and a plurality of processing units 170 when the delay adjustment control circuit 83 sets an appropriate delay element. Thereby, it is possible to further reduce the capacity of the register.

For example, when each of the pipelines P1 and P2 has six stages or more of processing units, it is possible to supply the third intermediate data A2 and A3 generated by the processing units 70d and 70e to the processing unit 170. Further, when the number of parallel pipelines is increased, it is possible to increase the third intermediate data A2 and A3 that can be used by other pipelines. For example, in FIG. 12, when there is a third pipeline P3 in addition to the first pipeline P1 and the third pipeline P3, it is possible to input the third intermediate data B2 and B3 generated by the third operator 176 into a processing unit of the third pipeline.

One or more of the operators 74 to 76, the operators 174 to 176, the operators 51, 53, 54, and 56, and the operators 151, 153, 154, and 156 perform an arithmetic operation based on, for example, a formula (13) and a formula (14) described in "Accurate and Efficient Stereo Processing by Semi-Global Matching and Mutual Information", Internet search: http://www.robotic.dlr.de/fileadmin/robotic/ hirschmu/cvpr05hh.pdf. For example, the fourth operator 156 and the fourth operator 56 perform an arithmetic operation based on the formula (14). Further, the third operator 176, the third operator 76, the third operator 54, and the third operator 154 perform an arithmetic operation based on the formula (13).

(About Propagation Direction and Target Pixel)

Figure 14:
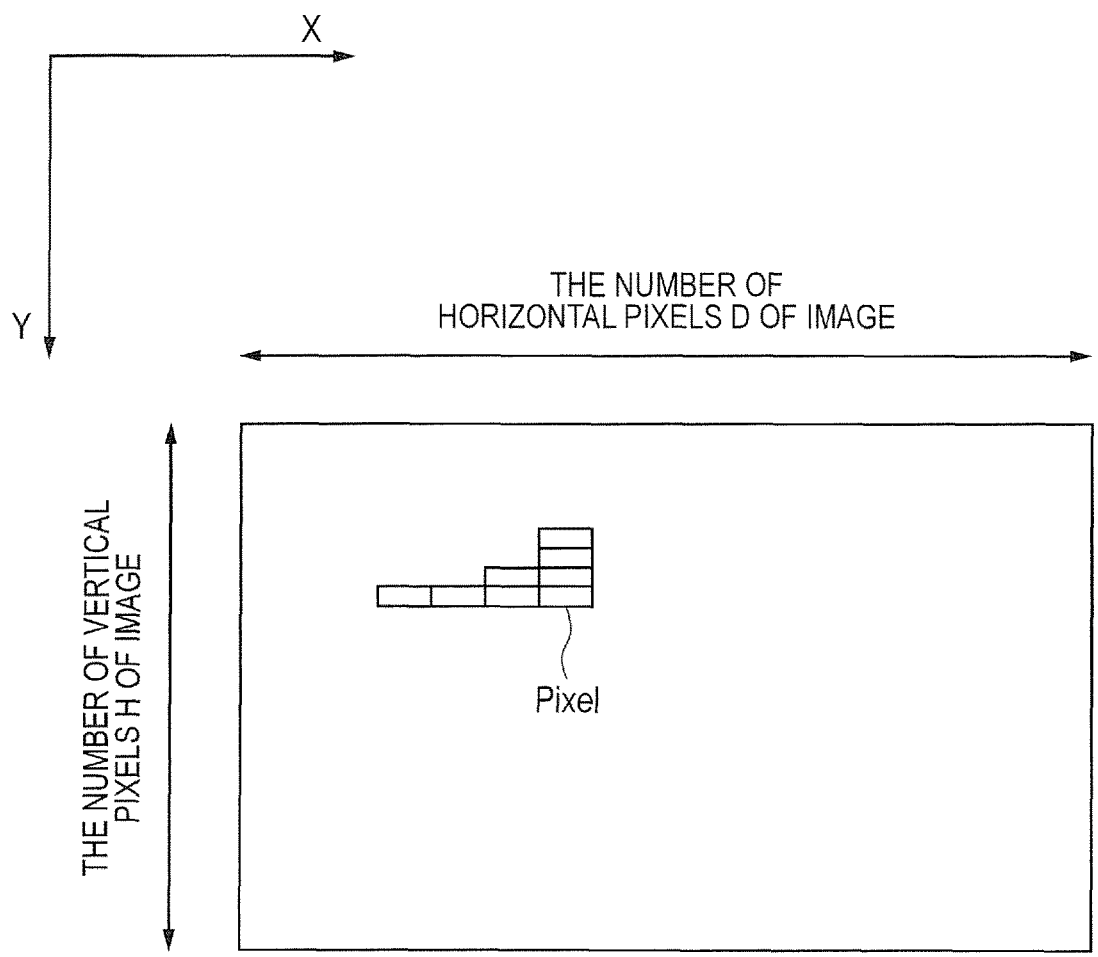
FIG. 14 is a diagram showing pixels included in an image.
Figure 15:
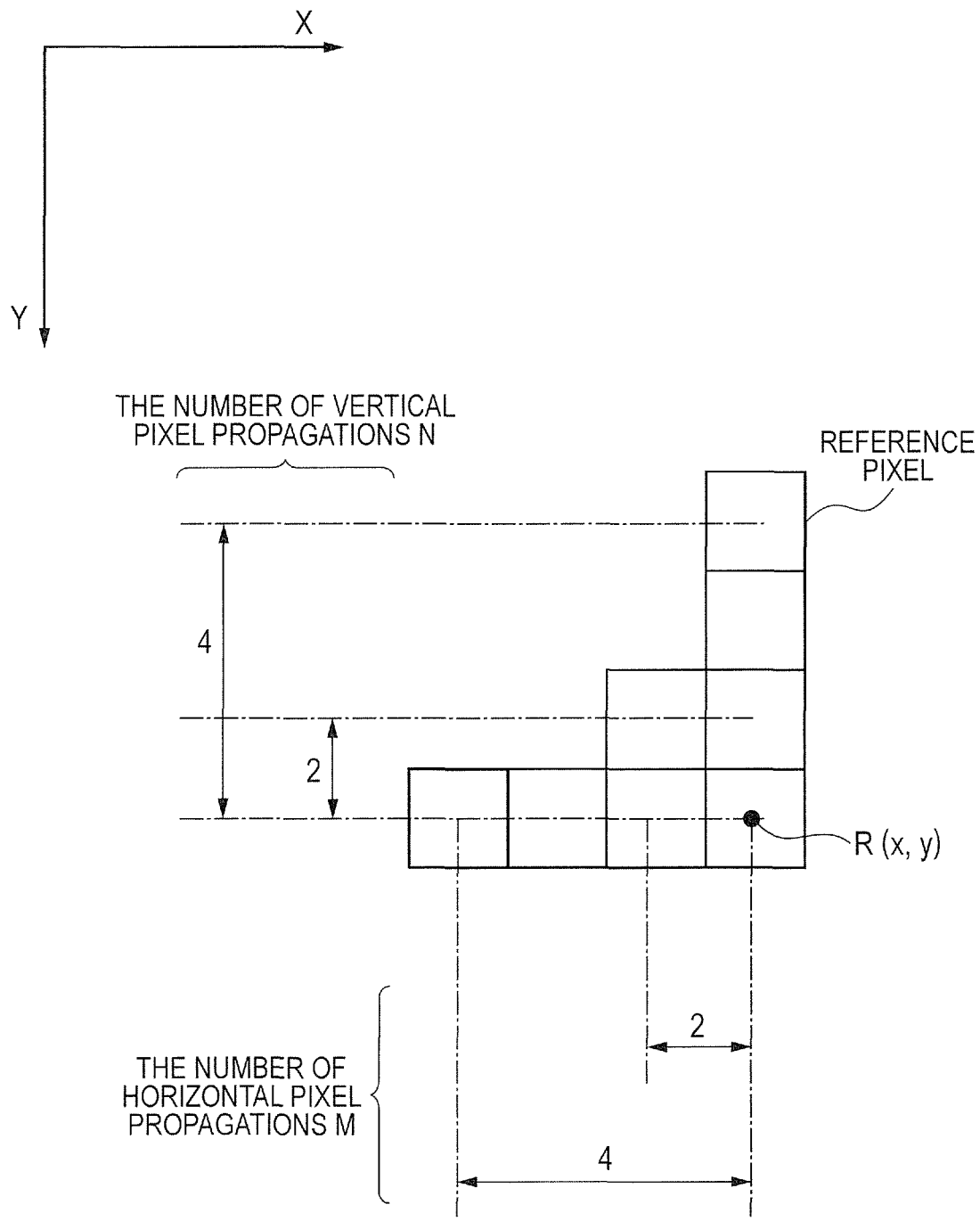
FIG. 15 is a diagram for explaining a pixel propagation direction of and the number of pixel propagations.

In the embodiment, the processing unit 70 of the first pipeline P1 defines a pixel located in a direction opposite to the propagation directions from the target pixel to the peripheral pixels as the target pixel. The reason of the above will be described with reference to FIGS. 14 and 15. FIG. 14 is a diagram for explaining a total number of pixels of the first and the second images. FIG. 15 is a diagram for explaining a pixel propagation direction and the number of pixel propagations.

As shown in FIG. 14, a total number of pixels in the horizontal direction of an image is defined as D, and a total number of pixels in the vertical direction of the image is defined as H. That is, the total number of pixels included in each of the first image R and the second image Ref is D×H.

As shown in FIG. 15, in the third operator, a direction from the target pixel R(x, y) to the reference pixel is the propagation direction. When the number of propagations is 1, there is no propagation. That is, the coordinates of the target pixel are the same as the coordinates of the reference pixel. Specifically, a horizontal pixel propagation direction is −X direction, and the number of horizontal pixel propagations M is 2 or 4. A vertical pixel propagation direction is −Y direction, and the number of vertical pixel propagations N is 2 or 4.

In the image processing method according to the embodiment, a necessary register cost C1 is represented as follows.

$$C1=L*\{(N-1)*M+P\}$$

Here, P is a degree of parallelization of the pipelines. The degree of parallelization is the number of pipelines arranged in parallel. A capacity R2 of a register varies according to the number of amplifications, the degree of parallelization, the horizontal pixel propagation direction, and the vertical pixel propagation direction.

On the other hand, when the image processing method according to the embodiment is not used, a necessary register cost C2 is represented as follows.

$$C2=L*D*H$$

As shown in FIG. 14, D is the total number of pixels in the horizontal direction of the image and H is the total number of pixels in the vertical direction of the image. Here, FIG. 16 shows a register cost in a case of N=2, M=4, D=640, and H=480. In FIG. 16, an input pixel is one bit. When the degree of parallelization P=128, the register cost of the image processing apparatus according to the embodiment can be about 1/100. Therefore, it is possible to prevent an increase of the capacity of the register. Thus, it is possible to efficiently perform image processing. In particular, it is possible to speed up the processing by increasing the number of parallelized pipelines (the degree of parallelization).

Further, the third intermediate data delayed by the delay elements 78a and 78b are supplied to the third operators 176a and 176b of the processing unit 170 over a pipeline. Specifically, the third intermediate data A2 and A3 delayed by the delay elements 78a and 78b provided in the processing unit 70 of the first pipeline P1 are inputted into the third operators 176a and 176b of the processing unit 170 included in the second pipeline P2. Then, the third operators 176a and 176b performs the third arithmetic operation based on the first intermediate data from the first operator 174 and the third intermediate data A2 and A3 from the delay elements 78a and 78b. By doing so, it is possible to use the third intermediate data A2 and A3 at an appropriate timing. Thereby it is possible to prevent the register cost from increasing.

Further, time axis adjustment of the third intermediate data is optimized by selection of the target pixel. By doing so, it is possible to refer to the third intermediate data A2 and A3 without increasing the amount of delay. Specifically, by appropriately setting positions of the target pixel of the first pipeline P1 and the target pixel of the second pipeline P2, it is possible to use the third intermediate data in the first pipeline P1 for an arithmetic operation in the second pipeline P2. When the third operators 76a and 76b perform the third arithmetic operation on the target pixel and the reference pixel shifted from the target pixel in the propagation direction, a direction from the target pixel of the processing unit 170 of the second pipeline P2 to the target pixel of the processing unit 70 of the first pipeline P1 is opposite to the propagation direction. For example, as shown in FIG. 10, the target pixel of the processing unit 170 is shifted from the target pixel of the processing unit 70 in the +X direction. In the processing unit 70, the propagation direction from the target pixel to the reference pixel is the −X direction. Thereby, it is possible to use the third intermediate data A2 and A3 with a small amount of delay.

Further, according to the image processing apparatus of the embodiment, it is possible to reduce the capacity of the line memory. A reduction of the line memory will be described with reference to FIG. 17. FIG. 17 is a diagram showing a configuration of a line memory of a comparative example and a configuration of the line memory in the image processing apparatus according to the embodiment. The configuration of the line memory in an image processing apparatus of the comparative example is shown in left side of FIG. 17, and the configuration of the line memory of the image processing apparatus according to the embodiment is shown in right side of FIG. 17.

In the comparative example, image data of an original image is stored for each line, so that the capacity of each line is the same. For example, the capacities of Y+0, Y+1, and Y+2 are the same. On the other hand, in the configuration of the embodiment, the reading position when the pipelines are parallelized moves according to N and M, so that an unnecessary portion is generated in a range in which the reading position moves. The unnecessary portion is not secured as a memory from the beginning.

As shown in FIG. 17, the line memory of the comparative example has a rectangular memory structure of X*Y. On the other hand, in the embodiment, the reference pixels can be changed in a staircase pattern, so that the line memory is not required to have a rectangular shape. For example, in the Y+0 line, it is required to hold pixels up to X+3. On the other hand, it is possible to reduce the number of pixels to be hold, up to X+2 in the Y+1 line and up to X+1 in the Y+2 line. Therefore, the line memory 81 does not have a portion corresponding to the pixels that can be reduced.

As described above, according to the embodiment, it is possible to reduce the capacity of the line memory by optimizing a memory structure for processing of the processing unit. Specifically, the line memory 81 includes a plurality of lines whose capacities are different from each other. Portions that can be reduced depend on parameters of N, M, and P. It is possible to reduce the capacity of the line memory by the parameters determined by N, M, and P. A specific capacity of the line memory is represented by the formula shown in FIG. 17.

When the number of parallel pipelines, the number of stages in each pipeline, the number of pixels in an image, the number of amplifications, the number of propagations, and the like are determined, the delay adjustment control circuit 83 may fix the amount of delay of the delay elements 78 and 178. In other words, when an arithmetic operation condition is fixed, the amount of delay can be constant. Therefore, the delay elements 78 and 178 whose amount of delay is fixed may be provided without providing the delay adjustment control circuit 83. The number of pipelines to be parallelized may be three or more. Thereby, even when the processing is sped up, it is possible to suppress increase of the register capacity. Therefore, it is possible to more smoothly process complicated contents. When the degree of parallelization, the number of propagations, and the like vary, the delay adjustment control circuit 83 may adjust the amount of delay.

Second Embodiment

A configuration of a processing unit of an image processing apparatus according to the second embodiment will be described with reference to FIG. 18. While a total number of propagations is three in the first embodiment, a total number of propagations in the second embodiment is four. Therefore, third operators 76a to 76c are provided in the processing unit 70 and third operators 176a to 176c are provided in the processing unit 170.

Third intermediate data A4 of the third operator 76c is inputted into the third operator 176c through a delay element 78c. Here, the amount of delay of the delay element 78c is greater than that of the delay elements 78a and 78b. The amount of delay of the delay element 78b is greater than that of the delay element 78a.

Figure 18:
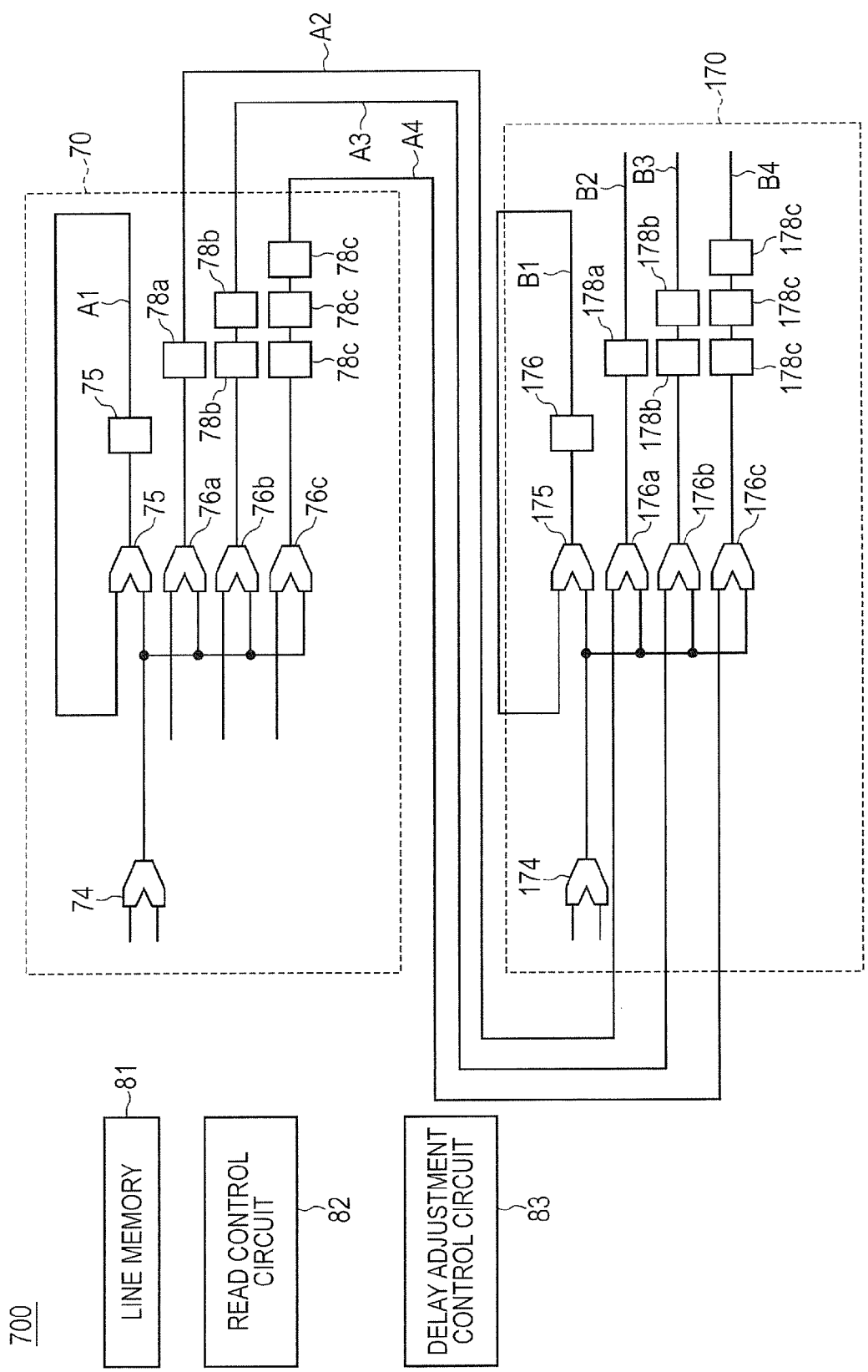
FIG. 18 is a diagram schematically showing a configuration of a processing unit of an image processing apparatus according to a second embodiment.
Figure 19:
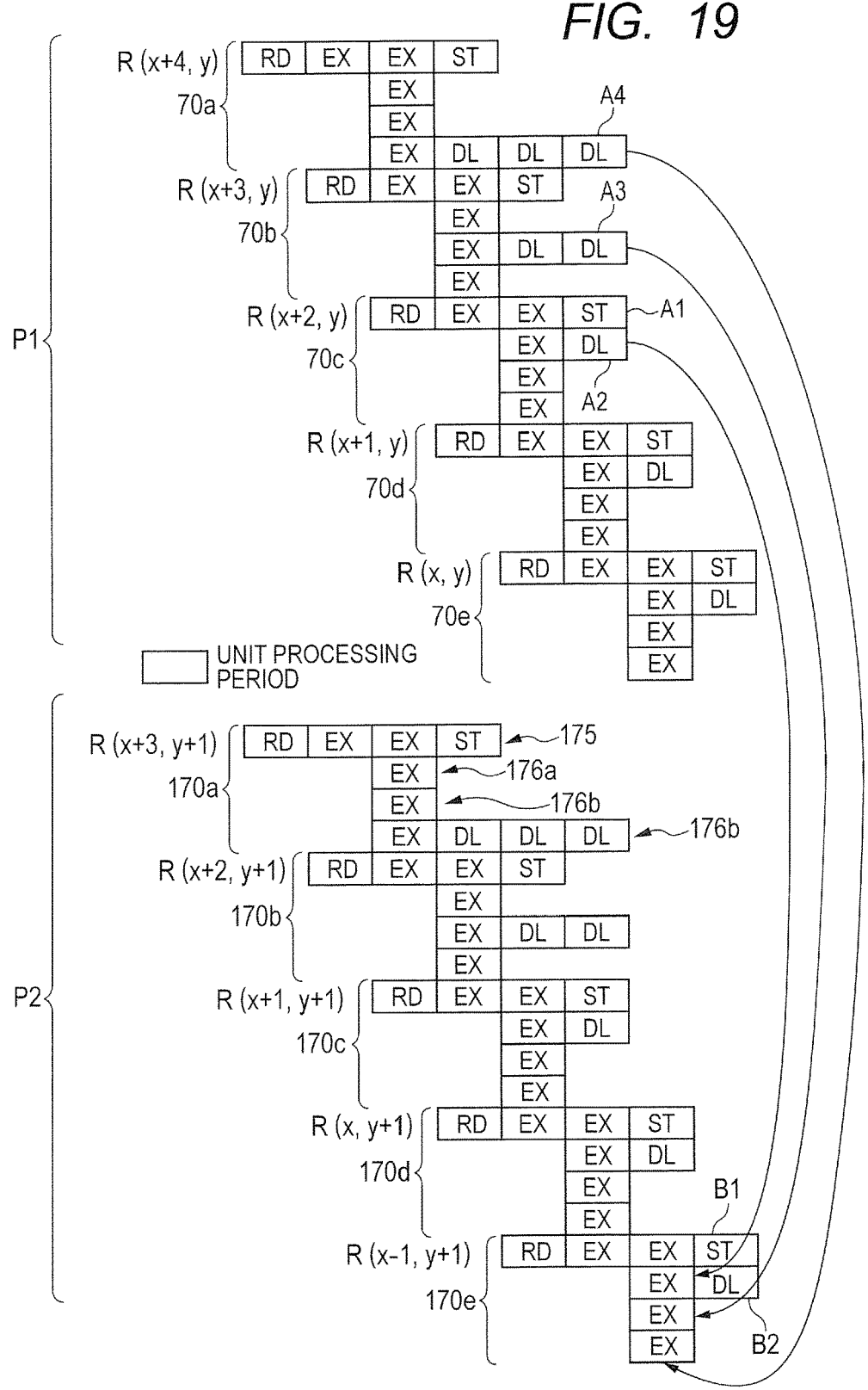
FIG. 19 is a diagram showing an execution flow in the processing shown in FIG. 18.

FIG. 19 shows a processing flow of the configuration shown in FIG. 18. The third intermediate data A4 of the processing unit 70a is inputted into the processing unit 170e through a delay of three unit processing periods. Then the processing unit 170e performs the third arithmetic operation by using the third intermediate data A2 to A4 inputted from the processing units 70a to 70c. Even in such a configuration, it is possible to obtain the same effect as that of the first embodiment. The amounts of delay of the third intermediate data A2 to A4 are different from each other by one unit processing period. In other words, the third intermediate data A2 to A4 from the three processing units 70a to 70c are inputted into one processing unit 170e through different amounts of delay.

Other Embodiments

Figure 20:
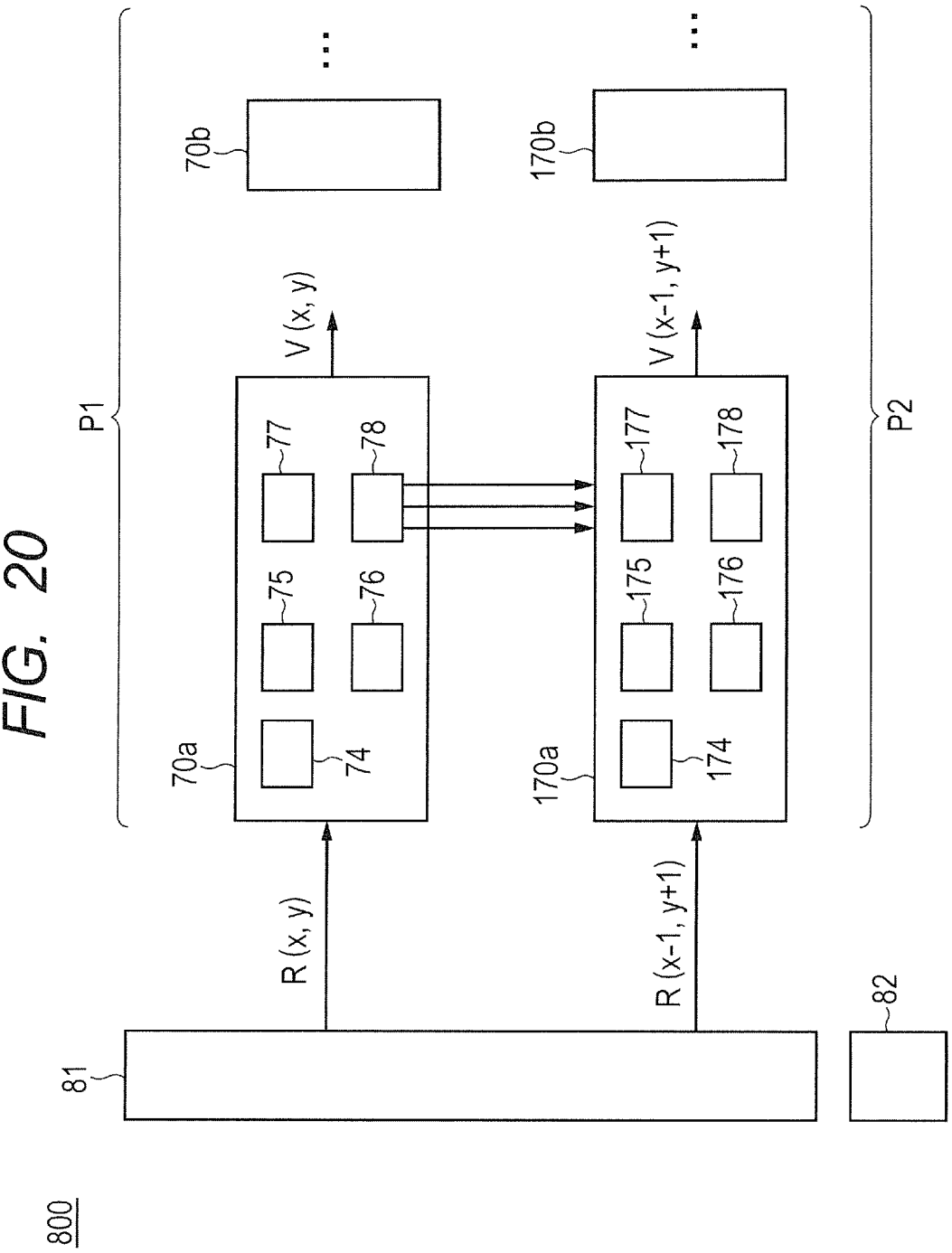
FIG. 20 is a block diagram showing a configuration of an image processing apparatus according to another embodiment.

FIG. 20 shows a configuration of an image processing apparatus according to another embodiment. The image processing apparatus 800 includes a line memory 81 that stores pixel data included in a first image and a second image, a plurality of pipelines P1 and P2 which are arranged in parallel and which have multi-stage processing units 70a, 70b, 170a, and 170b, each of which performs pipeline processing on the pixel data, and a line memory control circuit 82 that controls data reading from the line memory 81 to the processing units 70a, 70b, 170a, and 170b. The processing unit 70a includes a first operator 74 that performs a first arithmetic operation based on target pixel data corresponding to a target pixel of the first image and peripheral pixel data corresponding to peripheral pixels of a target pixel in the second image, a second operator 75 which performs a second arithmetic operation based on first intermediate data based on an arithmetic operation result of the first operator 74 and which calculates second intermediate data according to the first intermediate data of when the peripheral pixels are sequentially changed, a third operator 76 which performs a third arithmetic operation based on first intermediate data and which calculates third intermediate data according to the first intermediate data of when the peripheral pixels are sequentially changed, a register 77 that holds the second intermediate data of when the peripheral pixels are sequentially changed, and a delay element 78 that delays an arithmetic operation result of the third operator.

An image processing method according to an embodiment includes a step of developing pixel data included in a first image and a second image on a line memory, and a step of performing pipeline processing on the pixel data developed on the line memory by using multi-stage processing units of a plurality of pipelines arranged in parallel.

The step of performing pipeline processing includes steps (a) to (f) described below.

(a) a first arithmetic operation step in which a first operator performs an arithmetic operation based on target pixel data corresponding to a target pixel of the first image and peripheral pixel data corresponding to peripheral pixels of the target pixel in the second image, (b) a second arithmetic operation step in which a second operator performs a second arithmetic operation based on first intermediate data based on an arithmetic operation result in the first arithmetic operation step, (c) a step in which a register holds second intermediate data according to an arithmetic operation result of the second operator, (d) a third arithmetic operation step in which a third operator performs a third arithmetic operation based on the first intermediate data, (e) a step in which a delay element delays third intermediate data according to an arithmetic operation result of the third operator, and (f) a step which repeatedly performs steps (a) to (e) by sequentially changing the peripheral pixels.

In the above description, the image processing in the front monitoring system of a vehicle is described as an example. However, the image processing apparatus and the image processing method according to the embodiments can be applied to other than the front monitoring system. The image processing apparatus and the image processing method according to the embodiments can be applied to image recognition that accurately performs recognition of an object.

While the invention made by the inventors has been specifically described based on the embodiments, it is needless to say that the present invention is not limited to the embodiments and may be variously modified without departing from the scope of the invention.

What is claimed is:

1. An image processing apparatus comprising:
a line memory that stores pixel data included in a first image and a second image;
a plurality of pipelines which are arranged in parallel and which have multi-stage processing units, each of which performs pipeline processing on the pixel data to calculate output pixel data; and
a line memory control circuit that controls data reading from the line memory to the processing units,
wherein each of the processing units includes:
a first operator that performs a first arithmetic operation based on target pixel data corresponding to a target pixel of the first image and peripheral pixel data corresponding to peripheral pixels of the target pixel in the second image,
a second operator which performs a second arithmetic operation based on first intermediate data based on an arithmetic operation result of the first operator and which calculates second intermediate data according to the first intermediate data of when the peripheral pixels are sequentially changed with respect to the target pixel,
a third operator which performs a third arithmetic operation based on first intermediate data and which calculates third intermediate data according to the first intermediate data of when the peripheral pixels are sequentially changed with respect to the target pixel,
a register that holds the second intermediate data of when the peripheral pixels are sequentially changed with respect to the target pixel, and
a delay element that delays an input of the third intermediate data from the third operator to another one of the processing units,
wherein the output pixel data is outputted as an image processing result.

2. The image processing apparatus according to claim 1,
wherein the plurality of pipelines include a first pipeline and a second pipeline,
wherein the third intermediate data delayed by the delay element provided in the processing unit in the first pipeline is inputted into the third operator of the processing unit included in the second pipeline, and
wherein the third operator performs the third arithmetic operation based on the first intermediate data from the first operator and the third intermediate data from the delay element.

3. The image processing apparatus according to claim 2,
wherein the third operator performs the third arithmetic operation on the target pixel and a reference pixel shifted from the target pixel in a propagation direction, and
wherein a target pixel of a processing unit of the second pipeline is shifted from a target pixel of a processing unit of the first pipeline in a direction opposite to the propagation direction.

4. The image processing apparatus according to claim 1,
wherein the processing unit calculates a plurality of selection candidates by performing an arithmetic operation on the target pixel data and defines one selection candidate selected from the selection candidates as the output pixel data.

5. The image processing apparatus according to claim 1,
wherein the line memory includes a plurality of lines whose capacities are different from each other.

6. The image processing apparatus according to claim 1,
wherein the register inputs the held second intermediate data into the second operator, and
wherein the second operator performs the second arithmetic operation based on the first intermediate data and the second intermediate data.

7. The image processing apparatus according to claim 1, further comprising:
a delay adjustment control circuit that adjusts an amount of delay of the delay element.

8. The image processing apparatus according to claim 1,
wherein the first image and the second image are a stereo image captured by a stereo camera.

9. The image processing apparatus according to claim 1,
wherein two images captured by one camera at different timings are the first image and the second image.

10. A vehicle control apparatus comprising:
the image processing apparatus according to claim 1;
at least one camera that captures the first image and the second image; and
a control unit that controls a vehicle by using a processing result of the image processing apparatus.

11. An image processing method comprising the steps of:
developing pixel data included in a first image and a second image on a line memory;
performing pipeline processing on the pixel data developed on the line memory by using multi-stage processing units of a plurality of pipelines arranged in parallel to calculate output pixel data; and
outputting the output pixel data as an image processing result,
wherein the step of performing pipeline processing in each of the processing units includes:
(a) a first arithmetic operation step in which a first operator performs an arithmetic operation based on target pixel data corresponding to a target pixel of the first image and peripheral pixel data corresponding to peripheral pixels of the target pixel in the second image,
(b) a second arithmetic operation step in which a second operator performs a second arithmetic operation based on first intermediate data based on an arithmetic operation result in the first arithmetic operation step,
(c) a step in which a register holds second intermediate data based on an arithmetic operation result of the second operator,
(d) a third arithmetic operation step in which a third operator performs a third arithmetic operation based on the first intermediate data, (e) a step in which a delay element delays an input of third intermediate data to another one of the processing units according to an arithmetic operation result of the third operator, and (f) a step which repeatedly performs steps (a) to (e) by sequentially changing the peripheral pixels with respect to the target pixel.

12. The image processing method according to claim 11, wherein the plurality of pipelines include a first pipeline and a second pipeline, wherein the third intermediate data delayed by the delay element provided in the processing unit in the first pipeline is inputted into the third operator of the processing unit included in the second pipeline, and wherein the third operator performs the third arithmetic operation based on the first intermediate data from the first operator and the third intermediate data from the delay element.

13. The image processing method according to claim 12, wherein the third operator performs the third arithmetic operation on the target pixel and a reference pixel shifted from the target pixel in a propagation direction, and wherein a target pixel of the processing unit of the second pipeline is shifted from a target pixel of a processing unit of the first pipeline in a direction opposite to the propagation direction.

14. The image processing method according to claim 11, wherein the processing unit calculates a plurality of selection candidates by performing an arithmetic operation on the target pixel data and defines one selection candidate selected from the selection candidates as the output pixel data.

15. The image processing method according to claim 11, wherein the line memory includes a plurality of lines whose capacities are different from each other.

16. The image processing method according to claim 11, wherein the register inputs the held second intermediate data into the second operator, and wherein the second operator performs the second arithmetic operation based on the first intermediate data and the second intermediate data in the step (b).

17. The image processing method according to claim 11, wherein an amount of delay of the delay element is adjusted.

18. The image processing method according to claim 11, wherein the first image and the second image are a stereo image captured by two cameras.

19. The image processing method according to claim 11, wherein two images captured by one camera at different timings are the first image and the second image.

\* \* \* \* \*